(12) United States Patent
Kainoh et al.

(10) Patent No.: US 8,064,166 B2
(45) Date of Patent: Nov. 22, 2011

(54) HYDRODYNAMIC BEARING DEVICE, SPINDLE MOTOR, AND RECORDING AND REPRODUCING APPARATUS

(75) Inventors: Naoshi Kainoh, Ehime (JP); Akihito Shirai, Ehime (JP); Yoichi Nishimoto, Ehime (JP); Junichi Nakamura, Ehime (JP)

(73) Assignee: Panasonic Corporation, Osaka (JP)

( * ) Notice: Subject to any disclaimer, the term of this patent is extended or adjusted under 35 U.S.C. 154(b) by 563 days.

(21) Appl. No.: 12/276,862

(22) Filed: Nov. 24, 2008

(65) Prior Publication Data

US 2009/0168246 A1    Jul. 2, 2009

(30) Foreign Application Priority Data

Dec. 28, 2007  (JP) ................................. 2007-339264

(51) Int. Cl.
*G11B 5/60*  (2006.01)

(52) U.S. Cl. .......... 360/224; 360/55; 360/135; 384/112; 384/114

(58) Field of Classification Search .................. 360/224, 360/55, 135, 99.08; 384/112, 114
See application file for complete search history.

(56) References Cited

U.S. PATENT DOCUMENTS

| 6,315,452 | B1 * | 11/2001 | Titcomb ........................ 384/114 |
| 6,965,492 | B2 * | 11/2005 | Obata et al. ................. 360/99.08 |
| 2002/0181151 | A1 * | 12/2002 | Obata et al. ................. 360/99.08 |

FOREIGN PATENT DOCUMENTS

| JP | 10-503830 | 4/1998 |
| JP | 2001-90733 | 4/2001 |
| JP | 2002-250341 | 9/2002 |
| JP | 2007-182946 | 7/2007 |
| WO | 96/15381 | 5/1996 |

* cited by examiner

*Primary Examiner* — Huan Hoang
(74) *Attorney, Agent, or Firm* — Wenderoth, Lind & Ponack, L.L.P.

(57) ABSTRACT

An annular groove is provided to the rotary portion and/or the fixed portion in a bearing seal portion, and its cross section has a shape approximated by an arc. The annular groove is such that the relationship between the groove width W in a direction following the surface constituting a bearing seal portion and the groove depth Dg in a direction perpendicular to the surface constituting the bearing seal portion is $Dg/W < 0.4$.

16 Claims, 13 Drawing Sheets

HYDRODYNAMIC BEARING DEVICE, SPINDLE MOTOR, AND RECORDING AND REPRODUCING APPARATUS

BACKGROUND OF THE INVENTION

1. Field of the Invention

The present invention relates to a hydrodynamic bearing device used in a spindle motor or the like, and to a spindle motor and a recording and reproducing apparatus.

2. Description of the Related Art

Hydrodynamic bearing devices (hereinafter referred to as hydrodynamic bearings) that afford lower NRRO (non-repeatable runout) and are quieter because of non-contact rotation have been used in recent years in the spindle motors installed in hard disk drives (hereinafter referred to as HDDs) and other such disk driving apparatus. A hydrodynamic bearing has a structure in which a fluid (hereinafter referred to as a lubricating fluid) fills a gap between a stationary portion and a rotary portion, and to attain precise operation, it is essential to prevent leakage, etc., of the lubricating fluid, and to accurately manage the fill state of the lubricating fluid.

In general, a sealed structure is provided at the open end of the hydrodynamic bearing to prevent leakage of the lubricating fluid from the open end. One such sealed structure has a taper provided on the axial direction upper side, etc., of the rotary portion, so that the shape of the gap between the stationary portion and the rotary portion is tapered, increasing in size outward from the center of the rotational axis. This not only prevents leakage of the lubricating fluid by utilizing the surface tension of the lubricating fluid, but is also effective in terms of filling the gap with the lubricating fluid by utilizing capillary action when the lubricating fluid is poured in.

One method for managing the amount of lubricating fluid added is to measure the height of the lubricating fluid level using a measuring apparatus that combines an auto-focus microscope and a magnetic scale or the like (Patent Document 1: Japanese Laid-Open Patent Application 2001-90733). Another method is to provide an interface deformation portion so that the level of the lubricating fluid can be checked by eye to see if it is at the specified value (Patent Document 2: Japanese Laid-Open Patent Application 2007-182946).

SUMMARY OF THE INVENTION

Nevertheless, the following problems are encountered with the conventional apparatus mentioned above.

Specifically, with the measurement method disclosed in Patent Document 1, a dedicated measurement apparatus has to be readied. Consequently, if there is a problem with a hydrodynamic bearing used in a motor that has been shipped to the marketplace, a customer to whom this special apparatus is not available will not be able to diagnose the problem. Also, with the configuration of the hydrodynamic bearing disclosed in Patent Document 2, the inner space of the bearing seal portion has a high convex shape or a deep concave shape in the radial direction around the rotational axis of the shaft, so if the hydrodynamic bearing is subjected to vibration or impact while the lubricating fluid is low, or if the lubricating fluid level should fluctuate when the apparatus is started and stopped, for example, bubbles tend to find their way into the inner space of the bearing seal portion. Once bubbles get in, they are very unlikely to find their own way back out of the hydrodynamic bearing. If the hydrodynamic bearing continues rotating in this state, bubbles will also tend to work their way into the hydrodynamic bearing, and lubricating oil breakdown can lead to seizure in the hydrodynamic bearing.

Also, rotation of the bubbles themselves generates vibration which has the frequency of the half of rotational frequency in the rotary portion in the bearing interior, and this ends up causing NRRO. Furthermore, if the hydrodynamic bearing is placed under a reduced pressure environment, the bubbles will undergo volumetric expansion all at once, causing the lubricating fluid to overflow.

In view of this, it is an object of the present invention to solve the above-mentioned problems and provide a hydrodynamic bearing device, a spindle motor, and a recording and reproducing apparatus with which the admixture of bubbles is prevented, and even if bubbles should be admixed, the design makes it easier for the bubbles to escape, thereby preventing leakage of the lubricating fluid, etc., and allowing the fill state of the lubricating fluid to be managed accurately.

The hydrodynamic bearing device according to the first invention comprises a fixed portion, a rotary portion, a lubricant, a hydrodynamic bearing portion, a bearing seal portion, and at least one annular groove. The rotary portion rotates with respect to the fixed portion. The lubricant fills a microscopic gap between the rotary portion and the fixed portion. The hydrodynamic bearing portion supports the rotary portion rotatably with respect to the fixed portion via the lubricant. The bearing seal portion is formed between the rotary portion and the fixed portion, near the open end of the hydrodynamic bearing portion. The annular groove is provided to the rotary portion and/or the fixed portion at the bearing seal portion, with a cross section in the shape approximated by an arc or a substantially polygonal shape. Also, the annular groove is such that the relationship between the groove width W in a direction along the surface constituting the bearing seal portion and the groove depth Dg in a direction perpendicular to the surface constituting the bearing seal portion is determined on the basis of the following relational formula (1).

$$Dg/W < 0.4 \tag{1}$$

With this hydrodynamic bearing device, an annular groove is provided to the bearing seal portion in order to manage the lubricant (the filling and maintenance of the lubricant up to a specific level), and the annular groove is shaped in a way that tends to prevent the admixture of bubbles, and makes it easier for bubbles to escape even if they should be admixed.

The lubricant is usually adjusted during manufacture so that its level will be at a specific location of the tapered bearing seal portion. However, if the temperature rises, for example, the lubricant expands and its level rises. Conversely, the level will fall if the temperature drops, or if the lubricant evaporates and is reduced in quantity. If the level rises or falls beyond the ideal design range due to these changes, bubbles may find their way into the hydrodynamic bearing portion and diminish the bearing function, or the bubbles may expand, causing the lubricant to overflow from the bearing seal portion, so that the sealing function is lost.

In view of this, the groove is limited to a shape that will facilitate the discharge of bubbles. More specifically, the relationship between the groove width W and the groove depth Dg at which bubbles generated in the bearing portion under a reduced pressure environment or by a drop in temperature will not accumulate and grow inside the groove, and will instead be smoothly discharged, was found experimentally to be a groove in the shape approximated by the arc or the substantially polygonal shape (annular groove). This is expressed by Relational Formula 1.

It was found that bubbles can be effectively released from the annular groove as long as the shape of the annular groove of the bearing seal portion in the hydrodynamic bearing device satisfies Relational Formula 1. As a result, even if bubbles should find their way into the annular groove, they can be discharged to the outside of the bearing seal portion, and this improves the reliability of the sealing function.

The hydrodynamic bearing device of the present invention can be applied to either a hydrodynamic bearing device that is open at one end of the sleeve, or a hydrodynamic bearing device that is open at both ends of the sleeve. Also, one or more of the annular grooves may be formed near the upper or lower end of the fluid level.

The hydrodynamic bearing device according to the second invention is the hydrodynamic bearing device according to the first invention, wherein the relationship between the groove width W of the annular groove and the groove depth Dg is determined on the basis of the following relational formula (2).

$$Dg/W<0.3 \quad (2)$$

This more effectively prevents bubbles from accumulating in the annular groove because the groove depth Dg is smaller with respect to the groove width W.

The hydrodynamic bearing device according to the third invention is the hydrodynamic bearing device according to the first invention, wherein the relationship between the groove width W of the annular groove and the groove depth Dg is determined on the basis of the following relational formula (3).

$$0.025<Dg/W \quad (3)$$

Here, by setting the relationship between the groove width W of the annular groove and the groove depth Dg as above, there is a clear optical contrast at the interface of the annular groove, making it easier to ascertain the location of the annular groove when it is observed under an optical microscope with a magnification of 20 to 100 power. As a result, it can easily be ascertained that the fluid level has changed from that at the time of initial assembly by disposing at least one annular groove near the upper or lower end side of the fluid level in the bearing seal portion. Therefore, changes in the fill quantity of the lubricant can be easily ascertained even without readying an expensive and complicated fluid level measurement apparatus as discussed in Japanese Laid-Open Patent Application 2002-250341 and elsewhere. The result is that it is possible to easily ascertain a change in fluid level from a bearing life evaluation test or the like.

The hydrodynamic bearing device according to the fourth invention is the hydrodynamic bearing device according to the third invention, wherein the relationship between the groove width W of the annular groove and the groove depth Dg is determined on the basis of the following relational formula (4).

$$0.05<Dg/W \quad (4)$$

This gives a more distinct optical contrast to the interface of the annular groove, so that anyone can easily identify the annular groove without needing any special skill. This means that changes in the fluid level can be ascertained clearly and with good reproducibility.

The hydrodynamic bearing device according to the fifth invention is the hydrodynamic bearing device according to the first invention, wherein the annular groove is such that the relationship between the groove depth Dg and the maximum height roughness Rz is determined on the basis of the following relational formula (5). In what follows, the maximum height roughness Rz is defined by JIS B 0601, 2001.

$$Dg \geq 2Rz \quad (5)$$

Here, the shape of the annular groove is specified by the relationship between the maximum height roughness Rz and the groove depth Dg of the annular groove.

The annular groove is used as a marker for the height of the lubricant level in order to manage the fill state of the lubricant. Accordingly, it is preferable to be able to discern the annular groove with a simple microscope of low magnification. This allows the user to decide where the lubricant level is located with respect to the annular groove. However, it will be impossible to clearly discern the annular groove unless the depth of the annular groove is larger than the surface roughness at the bearing seal portion enough.

In view of this, the groove depth Dg is specified by Relational Formula (5) in order to determine the shape of the annular groove.

This means that the annular groove can be easily determined when observed under a microscope. This will now be described. The bearing seal portion needs to have as low a surface roughness as possible to ensure a good seal. Usually, its machining is performed simultaneously with the machining of the radial bearing portion and other such bearing faces, and it is usually finished to a maximum height roughness Rz comparable to that of the bearing face.

It was found that to clearly distinguish the annular groove from bumps and recesses caused by the surface roughness of the seal portion, the annular groove depth Dg should be at least two times the maximum height roughness Rz. FIGS. 11A and 11B show an example of this. As shown in these drawings, a roughness profile is obtained by subtracting the machining program profile indicated by the broken line from the cross sectional shape of the actual surface. The maximum height roughness Rz is obtained from this roughness profile, and to make out the annular groove position, the groove depth Dg must be several times larger than the maximum height roughness Rz. As shown in FIG. 11B, if the groove depth Dg is set to 3 μm in the machining program (indicated by the broken line), and the maximum height roughness Rz is a high 2.84 μm, so that the groove depth Dg and the maximum height roughness Rz end up being substantially the same, it will be difficult to make out the annular groove position. On the other hand, if the maximum height roughness Rz is 1.45 and therefore only half the groove depth Dg, the groove will be made out distinctly, and it will be easy to read this position with a low-power microscope. Thus, by setting the groove depth Dg to be at least two times the maximum height roughness Rz, it will be possible to determine the position of the lubricant level without it being affected by how the light shines on it or by the skill of the observer, for example, which allows the fill level of the lubricant to be managed more reliably.

The hydrodynamic bearing device according to the sixth invention is the hydrodynamic bearing device according to the fifth invention, wherein the groove depth Dg is at least 3 μm, and is ½ or less size of the gap between the fixed portion and the rotary portion at the location where the annular groove is disposed.

The depth of the annular groove will be defined here by giving specific numerical values.

Usually, a bearing seal portion is finished so that the maximum height roughness Rz is comparable to that of the bearing face, and the maximum height roughness Rz is about 1 to 1.5.

To clearly distinguish the annular groove from bumps and recesses caused by the surface roughness of the seal portion, the annular groove depth Dg is preferably at least 3 μm, which is at least two times the maximum height roughness Rz.

This allows the annular groove to be more clearly discerned when observed under a microscope. Therefore, the position of the lubricant level can be determined, which allows the fill level of the lubricant to be managed more reliably.

Also, if the groove depth Dg is too large, the bubbles will be too large in the annular groove. With a hydrodynamic bearing spindle motor used in a HDD, the gap between the fixed portion and the rotary portion of the bearing seal portion is usually about 200 to 300 µm. The diameter of the bubbles here must be smaller than the gap of the bearing seal portion for the bubbles to escape from the open end of the hydrodynamic bearing portion. If the central angle of the arc shape is more than 180 degrees, the bubbles will not be able to get out of the arc part. If the groove depth Dg here is 100 µm, for example, then bubbles with a radius of 100 µm (that is, a diameter of 200 µm) will form. Therefore, the gap of the bearing seal portion must be at least 200 µm. Put another way, the discharge of bubbles will not be hindered if the groove depth Dg is set to be ½ or less gap of the bearing seal portion.

The hydrodynamic bearing device according to the seventh invention is the hydrodynamic bearing device according to the first invention, wherein the intersection angle is at least 5 degrees at the point of contact between the face having the annular groove and the face that is in the shape approximated by the arc or the substantially polygonal shape.

The hydrodynamic bearing device according to the eighth invention is the hydrodynamic bearing device according to the seventh invention, wherein the intersection angle is at least 10 degrees at the point of contact between the face having the annular groove and the face of the annular groove that is in the shape approximated by the arc or the substantially polygonal shape.

A configuration is given here in which the preferred intersection angle of the groove shape is variously specified using different values.

Even if the groove depth is specified as above, if the width is too large in the axial direction for the annular groove in the shape approximated by the arc or the substantially polygonal shape, the intersection angle will be small at the point of contact between the face having the annular groove and the face that is in the shape approximated by the arc or the substantially polygonal shape, and it will be more difficult to distinguish between the annular groove and the bearing seal portion.

In view of this, the shape of the annular groove was also specified in terms of the intersection angle. More specifically, it has been found experimentally that when observed under a microscope, the intersection angle is preferably at least 5 degrees, and more preferably at least 10 degrees.

The result is that the position of the annular groove can be distinguished better when observed under an optical microscope having a magnification of about 20 to 100 times. Therefore, the position of the lubricant level with respect to the annular groove can be determined, which allows the fill level of the lubricant to be managed more reliably.

The hydrodynamic bearing device according to the ninth invention is the hydrodynamic bearing device according to the first invention, wherein the radius of curvature of the annular groove that is in the shape approximated by the arc or the substantially polygonal shape is at least 50 µm.

A configuration will be given here in which the groove shape is specified by specific numerical values for the minimum radius of curvature of the arc or the substantially polygonal shape.

Adding this further condition allows the effect of the present invention to be obtained more effectively. Therefore, even if bubbles should find their way into the annular groove, those bubbles can be more reliably discharged to outside the bearing seal portion, and this improves the reliability of the sealing function. This also allows the fill level of the lubricant to be managed more reliably.

Here, the lower limit (50 µm) to the radius of curvature of the shape approximated by the arc or the substantially polygonal shape is given by the condition of preventing bumping (discussed below) of the lubricant when used under a high-temperature environment. The upper limit is given according to either the second, fifth, or sixth invention.

The hydrodynamic bearing device according to the tenth invention comprises a fixed portion, a rotary portion, a lubricant, a hydrodynamic bearing portion, a bearing seal portion, and at least one annular groove. The rotary portion rotates with respect to the fixed portion. The lubricant fills a microscopic gap between the rotary portion and the fixed portion. The hydrodynamic bearing portion supports the rotary portion rotatably with respect to the fixed portion via the lubricant. The bearing seal portion is formed between the rotary portion and the fixed portion, near the open end of the hydrodynamic bearing portion. The annular groove is provided to the rotary portion and/or the fixed portion at the bearing seal portion, with a cross section in the shape approximated by an arc or a substantially polygonal shape.

Also, the intersection angle is at least 5 degrees at the point of contact between the face having the annular groove and the face that is in the shape approximated by the arc or the substantially polygonal shape.

The hydrodynamic bearing device according to the eleventh invention is the hydrodynamic bearing device according to the tenth invention, wherein the intersection angle is at least 10 degrees at the point of contact between the face having the annular groove and the face that is in the shape approximated by the arc or the substantially polygonal shape.

A configuration is given here in which the groove shape is variously specified using only the intersection angle.

If the width is too large in the axial direction for the annular groove in the shape approximated by the arc or the substantially polygonal shape, the intersection angle will be small at the point of contact between the face having the annular groove and the face that is in the shape approximated by the arc or the substantially polygonal shape, and it will be more difficult to distinguish between the annular groove and the face constituting the bearing seal portion.

In view of this, the shape of the annular groove was specified using the intersection angle. More specifically, it has been found experimentally that the intersection angle is preferably at least 5 degrees, and more preferably at least 10 degrees, in order to observe with an optical microscope having a magnification of about 20 to 100 times.

The result is that the position of the annular groove can be distinguished better when observed under an optical microscope. Therefore, the position of the lubricant level can be determined, which allows the fill level of the lubricant to be managed more reliably.

The hydrodynamic bearing device according to the twelfth invention is the hydrodynamic bearing device according to the tenth invention, wherein the annular groove is formed according to the range of tolerance for the position of the lubricant level.

A configuration will be given here in which the location of annual groove is specified on the basis of the range of tolerance for the position of the lubricant level.

The phrase "tolerance range" here refers to the range of fluctuation of the position of the lubricant level that is tolerated for the hydrodynamic bearing device to operate normally. For instance, if the annular groove is formed on the upper side in the axial direction of the bearing seal portion, the upper limit to the lubricant level is preferably located lower in the axial direction than the annular groove, and conversely, if the annular groove is formed on the lower side in the axial direction of the bearing seal portion, the lower limit to the lubricant level is preferably located lower in the axial direction than the annular groove. The annular groove position is not limited to this, however, and can be set as desired.

The amount of lubricant filling the bearing seal portion is determined by the configuration and shape of the hydrodynamic bearing device. Also, at least one annular groove is formed on the upper or lower side in the axial direction, as needed. The lubricant fill state may be managed on the basis of the fact that the position of the lubricant level is higher or lower than the annular groove in the axial direction.

This allows the position of the lubricant level to be determined, which allows the fill level of the lubricant to be managed more reliably. Also, the amount of lubricant can be evaluated without using a special measurement apparatus, not only during manufacture, but also if there is a fluctuation in the amount of lubricant after shipping to the customer, such as a drop in the level during evaporation, or a rise in the level due to the admixture of bubbles into the bearing interior.

The spindle motor according to the thirteenth invention comprises the hydrodynamic bearing device according to the first invention.

Here, the spindle motor is equipped with the above-mentioned hydrodynamic bearing device.

This allows the position of the lubricant level to be determined, which allows the fill level of the lubricant to be managed more reliably. Also, it is possible to provide a spindle motor with which the amount of lubricant can be evaluated without using a special measurement apparatus, not only during manufacture, but also if there is a fluctuation in the amount of lubricant after shipping to the customer, such as a drop in the level during evaporation, or a rise in the level due to the admixture of bubbles into the bearing interior.

The spindle motor according to the fourteenth invention comprises the hydrodynamic bearing device according to the tenth invention.

Here, the spindle motor is equipped with the above-mentioned hydrodynamic bearing device.

This allows the position of the lubricant level to be determined, which allows the fill level of the lubricant to be managed more reliably. Also, it is possible to provide a spindle motor with which the amount of lubricant can be evaluated without using a special measurement apparatus, not only during manufacture, but also if there is a fluctuation in the amount of lubricant after shipping to the customer, such as a drop in the level during evaporation, or a rise in the level due to the admixture of bubbles into the bearing interior.

The recording and reproducing apparatus according to the fifteenth invention comprises a recording medium, a head, and a spindle motor. The head is for recording and reproducing information to and from the recording medium. The spindle motor is the spindle motor according to the thirteenth invention, and is for rotationally driving the recording medium or the head.

Here, the recording and reproducing apparatus is equipped with the above-mentioned spindle motor.

This allows the position of the lubricant level to be determined, which allows the fill level of the lubricant to be managed more reliably. Also, it is possible to provide a recording and reproducing apparatus with which the amount of lubricant can be evaluated without using a special measurement apparatus, not only during manufacture, but also if there is a fluctuation in the amount of lubricant after shipping to the customer, such as a drop in the level during evaporation, or a rise in the level due to the admixture of bubbles into the bearing interior.

The recording and reproducing apparatus according to the sixteenth invention comprises a recording medium, a head, and a spindle motor. The head is for recording and reproducing information to and from the recording medium. The spindle motor is the spindle motor according to the fourteenth invention, and is for rotationally driving the recording medium or the head.

Here, the recording and reproducing apparatus is equipped with the above-mentioned spindle motor.

This allows the position of the lubricant level to be determined, which allows the fill level of the lubricant to be managed more reliably. Also, it is possible to provide a recording and reproducing apparatus with which the amount of lubricant can be evaluated without using a special measurement apparatus, not only during manufacture, but also if there is a fluctuation in the amount of lubricant after shipping to the customer, such as a drop in the level during evaporation, or a rise in the level due to the admixture of bubbles into the bearing interior.

With the hydrodynamic bearing device according to the present invention, even if bubbles should find their way into the annular groove, these bubbles can be discharged to the outside of the bearing seal portion, thereby improving the reliability of the sealing function.

DETAILED DESCRIPTION OF THE INVENTION

Figure 1:
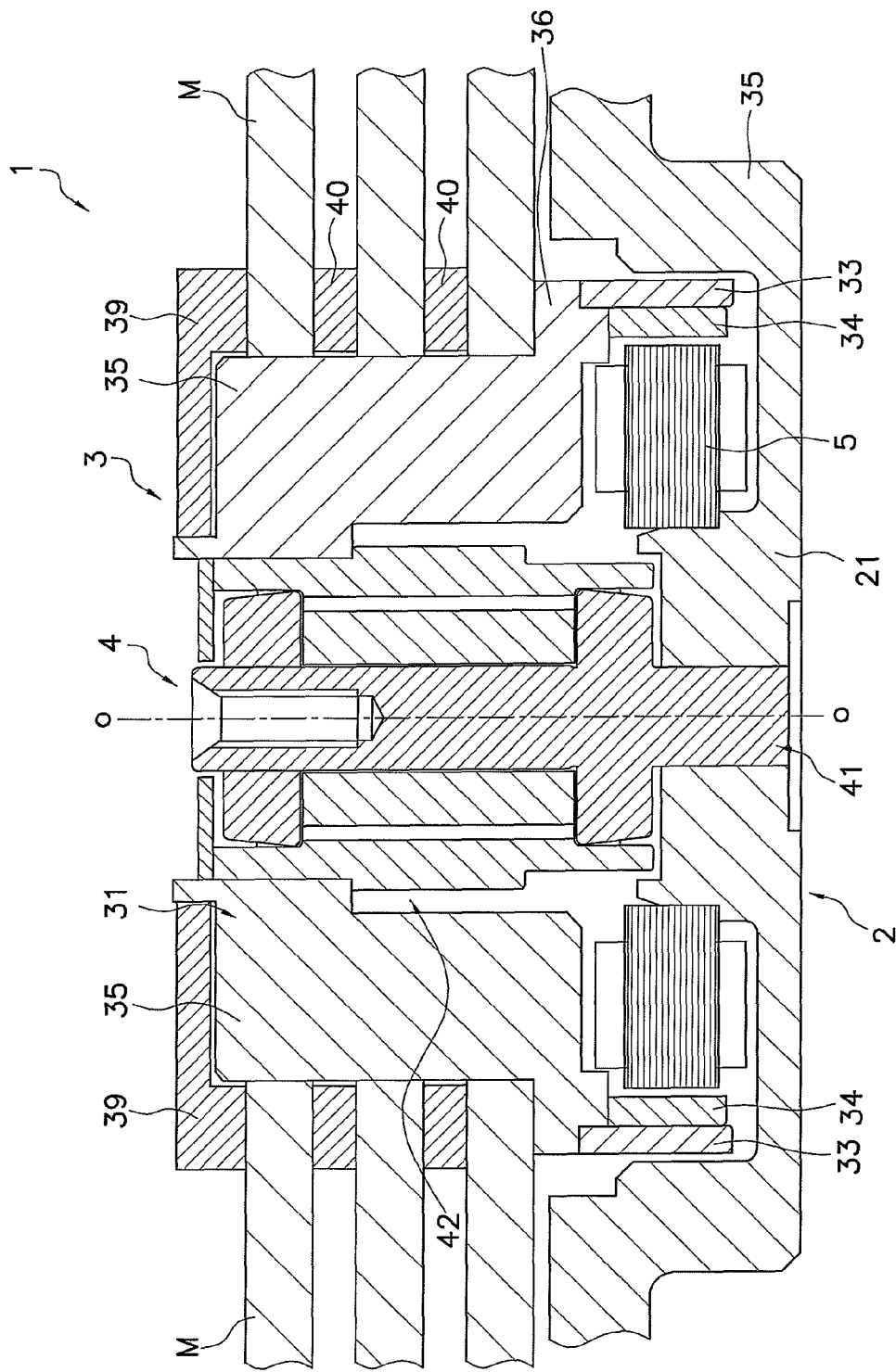
FIG. 1 is a cross section of the configuration of a spindle motor in which the hydrodynamic bearing device according to an embodiment of the present invention has been installed.

A spindle motor 1 comprising a hydrodynamic bearing device 4 according to an embodiment of the present invention will now be described through reference to FIGS. 1 to 12.

In this embodiment, for the sake of convenience, the up and down direction in the drawings will be referred to as the "axial direction upper side," "axial direction lower side," and so forth, but this is not intended to limit the actual state of attachment of the spindle motor 1.

Overall Configuration of Spindle Motor 1

As shown in FIG. 1, the spindle motor 1 mainly comprises a base plate 2, a stator 5, a rotor 3, and the hydrodynamic bearing device 4. The O-O line in FIG. 1 is the rotational axis of the spindle motor 1.

The base plate 2 constitutes the portion on the stationary side of the spindle motor 1, and is fixed, for example, to the housing (not shown) of a recording disk apparatus. (the housing and the base plate 2 may be a single integrated part). The base plate 2 has a cylindrical portion 21, and one end of a shaft 41 (see FIG. 2) of the hydrodynamic bearing device 4 is fixed on the inner peripheral side of the cylindrical portion 21.

The rotor 3 is a member on the rotating side of the spindle motor 1, and is rotationally driven by rotational force generated by a magnetic circuit. The configuration of the rotor 3 will be described in detail later on.

Figure 2:
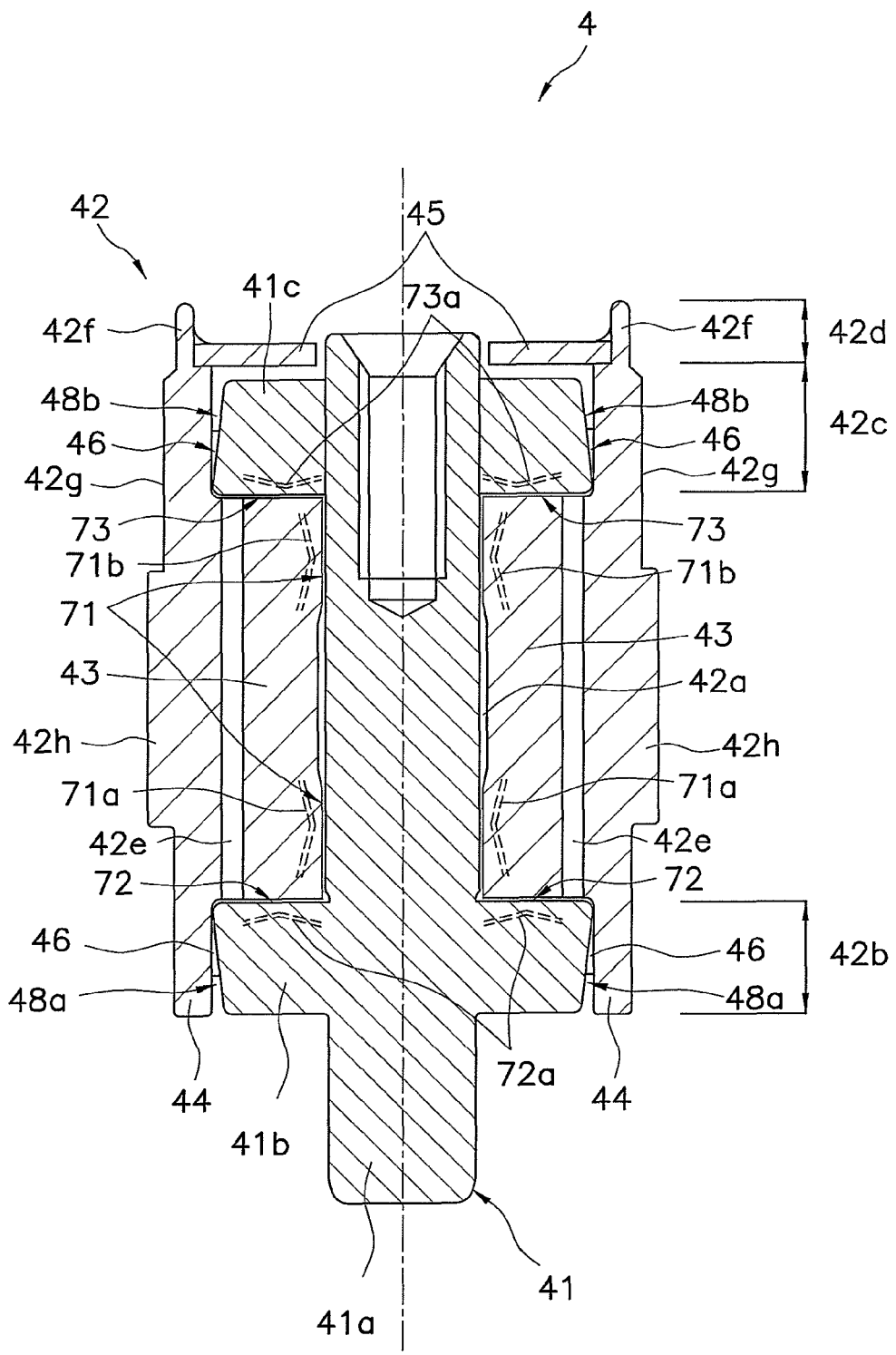
FIG. 2 is a detail view of the configuration of the hydrodynamic bearing device included in the spindle motor shown in FIG. 1.

As shown in FIG. 2, the hydrodynamic bearing device 4 is a device for supporting in a relatively rotatable state with respect to the base plate 2 and the stator 5. The hydrodynamic bearing device 4 will be described in detail later on.

The stator 5 constitutes a magnetic circuit along with a back yoke 33 and a rotor magnet 34 (discussed below), and is fixed to the outer peripheral side of the cylindrical portion 21. The rotor 3 is driven rotationally with respect to the base plate 2 and the stator 5 by drive force in the rotational direction generated by this magnetic circuit.

Configuration of Rotor 3

As shown in FIG. 1, the rotor 3 has the back yoke 33, the rotor magnet 34, and a rotor hub 31. The back yoke 33 is an annular member provided on the axial direction lower side of the rotor hub 31, and is fixed by press-fitting or the like. The back yoke 33 is made from a magnetic material.

The rotor magnet 34 is an annular member disposed so as to oppose the outer peripheral side of the stator 5 in the radial direction, and is fixed to the inner peripheral side of the back yoke 33.

The rotor hub 31 is a member on which a recording disk M is mounted, and is fixed by adhesive bonding or the like to the outer peripheral side of a sleeve 42 (see FIG. 2), which will be described below. As shown in FIG. 1, the rotor hub 31 has a rotor hub main body 35 and a disk placement portion 36.

The rotor hub main body 35 is a cylindrical portion that supports the recording disk M in the radial direction, and is fixed to the outer peripheral side of the sleeve 42. Three recording disks M, for example, are fitted on the outer peripheral side of the rotor hub main body 35.

The disk placement portion 36 is an annular portion for placing the recording disks M, and is formed on the outer peripheral side of the lower end in the axial direction of the rotor hub main body 35.

The recording disks M include, for example, magnetic disks and the like, from and to which information can be read and written by information access means (not shown). The recording disks M are fixed and disposed to the outside of the rotor hub main body 35 by a clamper 39. When a plurality of the recording disks M are fixed, the recording disks M are grasped and fixed, separated with a certain distance between them by spacers 40.

Configuration of Hydrodynamic Bearing Device 4

As shown in FIG. 2, the hydrodynamic bearing device 4 is a double-open-ended type of hydrodynamic bearing device in which both ends of the sleeve 42 are open, and has the shaft 41 and the sleeve 42. The hydrodynamic bearing device 4 is a fixed-shaft type of hydrodynamic bearing device in which a rotating member rotates around the fixed shaft 41.

Shaft 41

The shaft 41 is a member on the fixed side of the hydrodynamic bearing device 4, and its lower end in the axial direction is fixed to the cylindrical portion 21 of the base plate 2. The shaft 41 has a shaft main body 41*a*, a first thrust flange 41*b*, and a second thrust flange 41*c*.

The shaft main body 41*a* is a cylindrical member that constitutes the main part of the shaft 41, and is disposed on the inner peripheral side of the sleeve 42, with a microscopic gap between itself and the sleeve 42.

The first thrust flange 41*b* is, for example, an annular member that is formed integrally with the shaft main body 41*a*, and is disposed on the inner peripheral side of a first cylindrical protrusion 42*b* so as to oppose the axial direction lower side end face of the sleeve 42 in the axial direction via a microscopic gap.

The second thrust flange 41*c* is an annular member disposed on the opposite side from the first thrust flange 41*b* in the axial direction, and is fixed, for example, to the shaft main body 41*a* by laser welding, adhesive bonding, press-fitting, or the like. The second thrust flange 41*c* is disposed on the inner peripheral side of a second cylindrical protrusion 42*c* so as to oppose the axial direction upper side end face of the sleeve 42 with a microscopic gap interposed therebetween in the axial direction.

The first and second thrust flanges 41*b* and 41*c* have first and second thrust hydrodynamic grooves 72*a* and 73*a* formed in faces which oppose parts of the sleeve 42.

The first and second thrust hydrodynamic grooves 72*a* and 73*a* are formed in a herringbone pattern or a spiral pattern (not shown). The first and second thrust hydrodynamic grooves 72*a* and 73*a* formed in the first and second thrust flanges 41*b* and 41*c* will be described below in further detail.

The first and second thrust flanges 41*b* and 41*c* have a tapered shape of about six degrees on their outer peripheries. Specifically, the outer peripheral faces of the first and second thrust flanges 41*b* and 41*c* slope away from the inner peripheral faces of the first and second cylindrical protrusions 42*b* and 42*c* toward the axial direction lower side and upper side.

Sleeve 42

The sleeve 42 is a cylindrical member on the rotating side, which is substantially in vertical symmetry and is included in the hydrodynamic bearing device 4, and is a cylindrical member disposed in a state of being rotatable relative to the shaft 41. The sleeve 42 is such that, for example, an inner sleeve 43 having a plurality of D-cuts formed in its outer peripheral face is lightly press-fitted (inserted) into an outer sleeve 44 with the use of an adhesive, thereby forming a cylindrical portion having communicating holes 42*e* (discussed below). More specifically, the sleeve 42 is constituted, as mentioned above, by the inner sleeve 43 and the outer sleeve 44, and has a plurality of radial hydrodynamic grooves 71*a* and 71*b*, a concave portion 42*a*, the first cylindrical protrusion 42*b*, the second cylindrical protrusion 42*c*, a fixed portion 42*d*, a plurality of communicating holes 42*e*, a clamper inner-contact portion 42*f*, a rotor hub inner-contact portion 42*g*, an annular convex portion 42*h*, and annular grooves 49*a* and 49*b*.

The radial hydrodynamic grooves 71*a* and 71*b* are grooves disposed on the inner peripheral face of the sleeve 42 and evenly spaced in the circumferential direction, and are formed in a herringbone pattern (not shown).

The concave portion 42a is an annular recessed portion formed on the inner peripheral side of the sleeve 42, and is disposed between the radial hydrodynamic grooves 71a and 71b in the axial direction.

The first and the second cylindrical protrusions 42b and 42c are cylindrical portions in which the outer peripheries on both ends of the sleeve 42 protrude outward in the axial direction. The first and the second thrust flanges 41b and 41c are disposed on the inner peripheries of the first and the second cylindrical protrusions 42b and 42c. Therefore, the inside diameter of the first and the second cylindrical protrusions 42b and 42c is set to be larger than the inside diameter of the sleeve 42.

The fixed portion 42d is a cylindrical portion of the sleeve 42 which protrudes farther to the axial direction upper side from the end of the second cylindrical protrusion 42c. The inside diameter of the fixed portion 42d is set to be larger than the inside diameter of the second cylindrical protrusion 42c, and a cover 45 is fixed to the inner peripheral side of the fixed portion 42d by adhesive bonding or the like.

The communicating holes 42e are formed between the inner sleeve 43 and the outer sleeve 44, and are disposed evenly spaced in the circumferential direction, for example, so as to pass through the sleeve 42 in the axial direction.

The clamper inner-contact portion 42f is a portion where the clamper 39 for fixing the recording disks M to the rotor hub 31 touches the outer part of the sleeve 42, and is a cylindrical portion that protrudes farther to the axial direction upper side from the end of the second cylindrical protrusion 42c. In this embodiment, the fixed portion 42d and the clamper inner-contact portion 42f refer to the same portion.

The rotor hub inner-contact portion 42g is a portion where the rotor hub 31 (see FIG. 1) is attached to the sleeve 42 so as to come into contact on the inner side.

The annular convex portion 42h is an annular convex portion formed near the center of the sleeve 42 in the axial direction.

Figure 3:
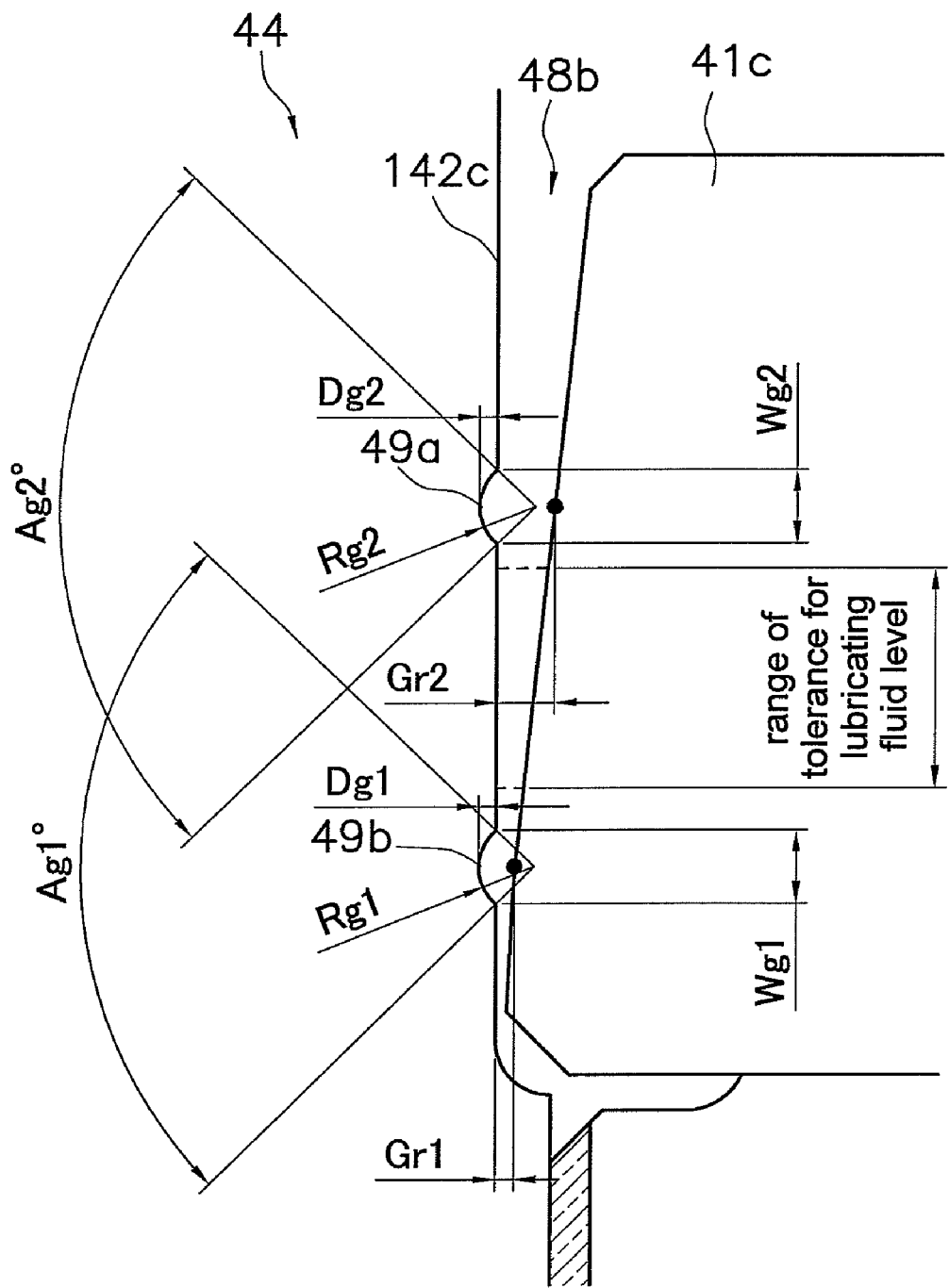
FIG. 3 is a detail view of the configuration near the tapered seal portion included in the hydrodynamic bearing device shown in FIG. 2.

As shown in FIG. 3, the annular grooves 49a and 49b are formed on the axial direction upper and lower sides, respectively, in the inner peripheral face of the outer sleeve 44 so as to be opposite the second thrust flange 41c. The annular grooves 49a and 49b may also be formed so as to be opposite the first thrust flange 41b. These annular grooves will be discussed in detail below.

Configuration of Bearings 71, 72, and 73 between Shaft 41 and Sleeve 42

The gap between the shaft 41 and the sleeve 42 is filled with a lubricating fluid (lubricant) 46 serving as a working fluid. Examples of this lubricating fluid include ester-based oils, fluorine-based lubricating fluids, and ionic liquids. Tapered seal portions (bearing seal portions) 48a and 48b are formed between the first thrust flange 41b and the first cylindrical protrusion 42b, and between the second thrust flange 41c and the second cylindrical protrusion 42c.

With this hydrodynamic bearing device 4, a radial bearing portion (hydrodynamic bearing portion) 71 that supports the rotor 3 in the radial direction is constituted by the sleeve 42 having the radial hydrodynamic grooves 71a and 71b, the shaft 41, and the lubricating fluid 46 interposed therebetween. A first thrust bearing portion (hydrodynamic bearing portion) 72 that supports the rotor 3 in the axial direction is constituted by the first thrust flange 41b having the first thrust hydrodynamic groove 72a, the sleeve 42, and the lubricating fluid 46 interposed therebetween. A second thrust bearing portion (hydrodynamic bearing portion) 73 that supports the rotor 3 in the axial direction is constituted by the second thrust flange 41c having the second thrust hydrodynamic groove 73a, the sleeve 42, and the lubricating fluid 46 interposed therebetween.

When a member on the rotating side (such as the sleeve 42) rotates relative to a member on the fixed side (such as the shaft 41), a force (hydrodynamic pressure) that maintains a certain gap from the member on the rotating side is generated in the radial direction and the axial direction of the shaft 41 at the bearing portions 71, 72, and 73. As a result, a non-contact state is maintained between the member on the rotating side and the member on the fixed side, which affords a more efficient start to the rotation of the spindle motor 1.

Annular Grooves 49a and 49b

The annular grooves 49a and 49b are shown in FIG. 3, in which, at the tapered seal portion 48b, the cross sections of each are formed in an arc shape on the axial direction upper and lower sides of the inner peripheral face 142c of the second cylindrical protrusion 42c of the outer sleeve 44, so as to be opposite the second thrust flange 41c. These annular grooves are disposed on the basis of the fluctuation range of the level position of the lubricating fluid 46 that is tolerated for the hydrodynamic bearing device 4 to operate normally. Here, the maximum height of the level of the lubricating fluid 46 must not go past the position of the annular groove 49a. Also, the minimum height of the level in a normal operating state is set not to be lower than the position of the annular groove 49b.

The parameters for various conditions will now be defined for these annular grooves. The annular groove 49a is used in the description that follows, but 49b has the same shape unless otherwise specified.

Condition 1: The annular groove 49a can be clearly seen under a microscope when the annular groove 49a of the tapered seal portion 48b is observed from the axial direction upper side.

The annular groove 49a is provided to the inner peripheral face 142c of the second cylindrical protrusion 42c, and the presence of the annular groove 49a cannot be identified clearly if the groove depth Dg2 (see FIG. 3) of the annular groove 49a is not sufficiently larger than the surface roughness of the inner peripheral face 142c. Meanwhile, to ensure the sealing function of the tapered seal portion 48b, the surface roughness of the inner peripheral face 142c needs to be made as small as possible. This machining is usually carried out simultaneously with the machining of the bearing face, and the inner peripheral face 142c is finished to a surface roughness maximum height Rz (JIS B 0601, 2001) that is substantially comparable to the surface roughness of the bearing face. The maximum height Rz of surface roughness here is about 1 to 1.5. In this case, as long as the groove depth Dg is at least 3 μm, which is at least two times Rz (Dg≧2Rz), the annular groove 49a can be adequately identified under a microscope from the axial direction upper side. The upper limit to the groove depth Dg is determined by the condition that any bubbles that separate from the annular groove 49a must be able to pass through the gap of the tapered seal portion 48b at the position of the annular groove 49a. That is, the maximum value for the annular groove 49a is ½ the gap ΔR at the tapered seal portion 48b.

Figure 4:
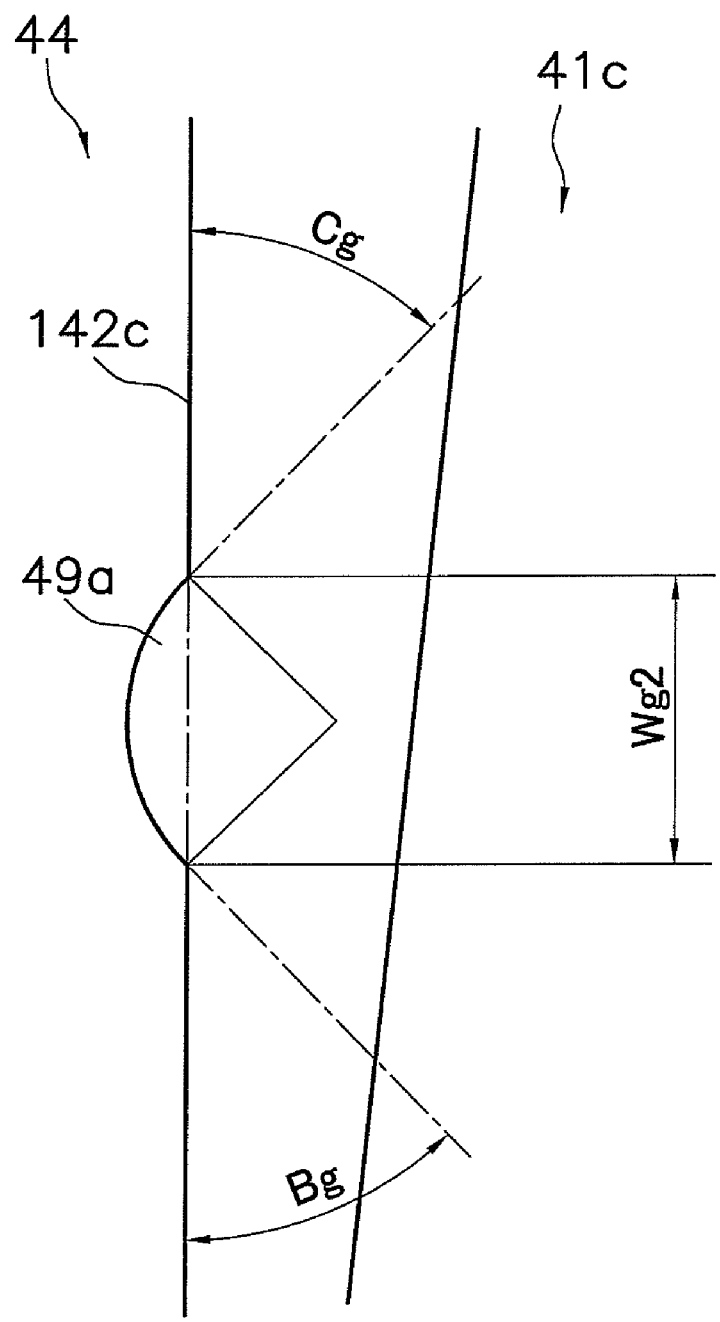
FIG. 4 is a detail view of near the annular groove included in the tapered seal portion shown in FIG. 3.

Meanwhile, even if the groove depth Dg is adequate, if the width Wg2 of the annular groove 49a in the axial direction is too large, the intersection angles Bg and Cg at the point of contact between the inner peripheral face 142c and the arc face of the annular groove 49a shown in FIG. 4 will be smaller, making it harder to distinguish the inner peripheral face 142c from the annular groove 49a. For these two to be clearly distinguished under a microscope, the intersection angles Bg and Cg must be at least 5 degrees, and preferably at least 10 degrees. From another point of view, the groove depth Dg is preferably larger than a certain size with respect to the groove width W. More specifically, Dg/W is preferably larger than 0.025, and more preferably larger than 0.05. To be larger than 0.1 is even better. To satisfy this relationship, in turning the sleeve on the lathe, the nose R of the tool bit is preferably 200 μm or less, or 300 μm or less. When the intersection angles Bg and Cg are determined here, the evaluation excludes slight chamfering or rounding with a width of 50 μm or less in the axial direction.

Condition 2: Bubbles do not Accumulate in the Annular Groove 49a

If the groove depth Dg of the annular groove 49a is larger, the annular groove 49a will be more clearly discernible, as mentioned above. However, it is also necessary to note that if bubbles find their way into the annular groove 49a, or if a state occurs in which bubbles accumulate in the annular groove 49a, the hydrodynamic bearing device 4 will lose its sealing function. Specifically, in a state in which there are bubbles inside the annular groove 49a, under a reduced pressure environment, for example, the bubbles will expand and block off the gap of the tapered seal portion 48b. As the reduced pressure state progresses, the lubricating fluid 46 may overflow from the tapered seal portion 48b, or the bubbles may pop, the impact of which can cause the lubricating fluid 46 to be splattered away from the tapered seal portion 48b. In view of this, an attempt was made to further specify the annular groove 49a in order to prevent this problem.

The conditions for bubbles to accumulate in the annular groove 49a depend not only on the groove depth Dg, but also on the maximum height roughness Rz of the inner peripheral face 142c, the intersection angles Bg and Cg at the point of contact between the annular groove 49a and the inner peripheral face 142c, the dimensions at the corner radius R of the annular groove 49a, the opening distance of the tapered seal portion 48b in the radial direction with respect to the rotational axis, and so forth.

Before going into the conditions under which bubbles accumulate, we will first clarify the causes of bubble generation. These will be described below, divided into first to third causes.

a) First Cause

If the hydrodynamic bearing device 4 is suddenly placed under a high temperature (such as about 100° C.) after the lubricating fluid 46 has absorbed moisture from the air at normal temperature, the absorbed moisture creates bubbles in the course of evaporating.

The generation of bubbles by moisture evaporation is closely correlated to the maximum height roughness Rz of the annular groove 49a and the tapered seal portion 48b (and particularly the inner peripheral face 142c) exposed to the atmosphere, the corner radius R, and the thermal conductivity of the metal that makes up the tapered seal portion 48b. When the temperature of the hydrodynamic bearing device 4 rises at a rapid rate, the hydrodynamic bearing device 4 does not have a uniform temperature all over, and viewed on the micro scale, the temperature is highest near metal surfaces where the thermal conductivity is larger. Bubbles of water vapor are generated at these metal surfaces. Once bubbles are generated, the moisture in the lubricating fluid 46 is absorbed into bubbles from the bubble surface, thermal energy is supplied from the metal surfaces, and the volume of the bubbles increases rapidly.

If the tapered seal portion 48b opens upward with respect to the gravitational direction, any bubbles that form will be separated by their own buoyancy from the surface of the annular groove 49a and the inner peripheral face 142c, and will gradually move to the surface of the lubricating fluid 46, and therefore will not accumulate in the interior of the annular groove 49a. However, if the maximum height roughness Rz of the inner peripheral face 142c and the annular groove 49a is large, or if the corner radius R is small, or if the opening distance of the tapered seal portion 48b in the radial direction with respect to the rotational axis is small, bubbles will end up accumulating in the annular groove 49a because of surface tension. Only when the volume of the bubbles increases to the point that the buoyancy of the bubbles overcomes this surface tension, the bubbles begin to separate from inside the annular groove 49a. If the bubbles here do not separate smoothly, then bubbles that have grown large will attempt to escape to the surface of the lubricating fluid 46, causing the lubricating fluid 46 to overflow from the tapered seal portion 48b and be scattered. This can be considered to be the explosion of the bubbles due to bumping.

b) Second Cause

In the assembly of the hydrodynamic bearing device 4, such as when the motor including the hydrodynamic bearing device 4 and other such parts are installed, it is subjected to impact loads, causing the shaft 41 and the sleeve 42 (see FIG. 2 for both) to move relative to one another. When this causes the level of the lubricating fluid 46 to drop farther to the axial direction lower side from a specific location, bubbles will be apt to find their way into the annular groove 49a.

c) Third Cause

Under a high-temperature condition, if the lubricating fluid 46 is changed to a low-temperature condition after having absorbed oxygen and nitrogen from the air, the oxygen and nitrogen dissolved in the lubricating fluid 46 will reach a saturated state and form bubbles.

Most of a liquid is usually in a state of equilibrium, with gases in a dissolved state. The lubricating fluid 46 is no exception, and air components are dissolved in specific amounts according to the temperature and the partial pressure of these gas components. The solubility thereof, however, is highest near the opening, rather than the interior portions of the tapered seal portion 48b. This is because during the manufacture of the hydrodynamic bearing device 4, it is deaerated to about $10^{-5}$ Pa and left that way for a specific length of time, then filled with the lubricating fluid, in order to remove the gas components in the lubricating fluid 46 prior to assembly. Meanwhile, the area near the opening of the tapered seal portion 48b is exposed to the atmosphere at all times after assembly, and is subjected to atmospheric pressure, and therefore reaches a saturated state within a few hours after assembly.

The above phenomenon will now be described in detail using the standard theory.

The solubility of a gas, once the combination of gas and liquid is determined, thereafter varies according to temperature and saturated vapor pressure. For instance, when $O_2$ or $CO_2$ is dissolved in water, the lower is the temperature, the higher is the solubility, and conversely, the higher is the temperature, the more solubility decreases. With both gases, the higher is its saturated vapor pressure, the more the solubility increases substantially in proportion thereto.

Figure 5:
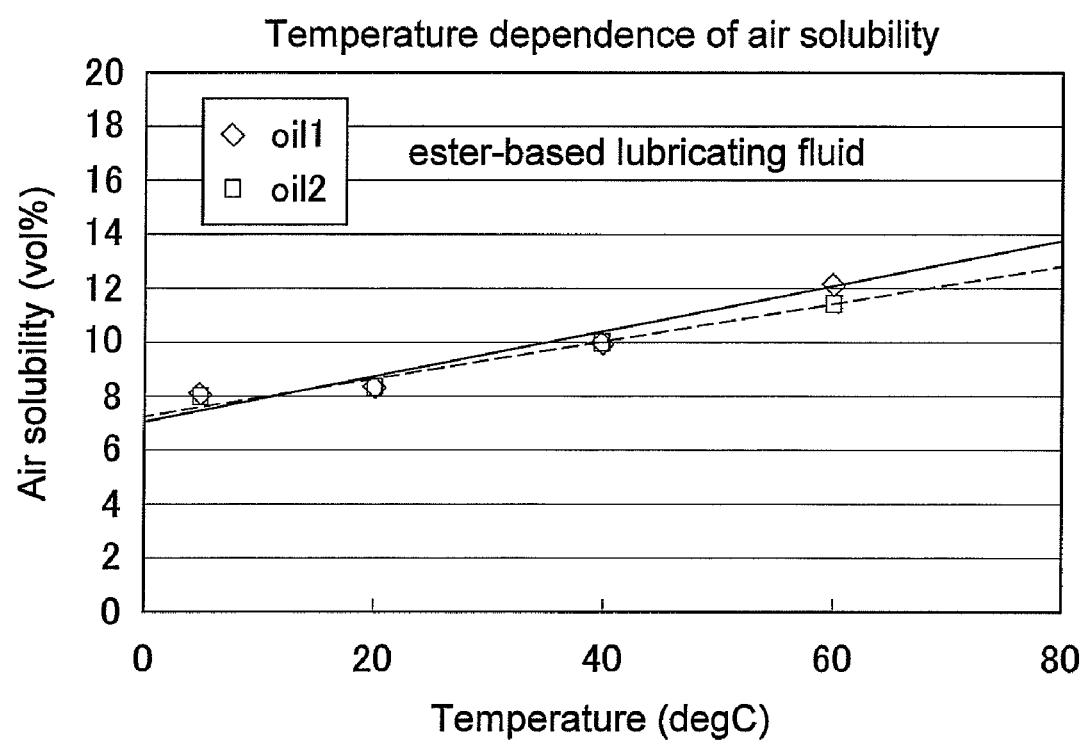
FIG. 5 is a graph of temperature versus gas solubility in an ester-based lubricating fluid.

However, unlike the case with water, the tendency is different with a lubricating fluid. For example, as shown in FIG. 5, with an ester-based lubricating fluid, which are widely used in hydrodynamic bearing devices, the solubility of air rises along with temperature. And this applies not just to ester-based lubricating fluids; most of the lubricating fluids that could be used in bearing devices are normally believed to have properties such that the higher the temperature, the more readily air dissolves.

When the shaft in a hydrodynamic bearing device rotates relative to the sleeve, because a hydrodynamic groove is formed, portions of high and low pressure are generated inside the hydrodynamic bearing device. Depending on the specifications of the hydrodynamic bearing device, a portion where the pressure is below atmospheric pressure, known as a cavity, may be generated during rotation. In this cavity, once the gas components dissolved in the lubricating fluid reach a saturated state, making any further dissolution impossible, they become bubbles inside the bearing portion. It seems that this bubble generation tends to occur near the opening to the tapered seal portion, where gases are more likely to be dissolved. As the rotation of the hydrodynamic bearing device proceeds, however, the lubricating fluid is circulated into the interior of the bearing device, so even the lubricating fluid that was near the open end reaches all the deepest parts of the bearing device. As a result, bubbles may be generated even inside the bearing device. To prevent this, the pressure distribution inside the hydrodynamic bearing device must be set so that bubbles do not find their way into the interior.

These bubbles tend to accumulate near the hydrodynamic groove inside the bearing device during rotation. However, during rotation the shaft vibrates slightly in the sleeve, the causes of which include magnetic vibrations accompanying the rotation of the motor. As a result, the bubbles also vibrate in a non-steady state, and attempt to move along with the lubricating fluid through the microscopic gap of the bearing device, so volumetric fluctuation of the bubbles generally results in the occurrence of NRRO of one-half rotation. Vibration equal to one-half rotation is a vibration component having half the frequency of the rotation frequency. Once the rotation stops, the bubbles begin accumulating over a wider gap within the bearing interior.

Also, since air is more likely to dissolve into the lubricating fluid under higher temperatures, during operation in which the hydrodynamic bearing device is in a high-temperature state, atmospheric components are dissolved in even larger amounts in the lubricating fluid. If a bearing device operating in such an environment is taken to a lower-temperature environment, the oxygen and nitrogen inside the lubricating fluid will reach a supersaturated state and generate bubbles. The situation is similar to that of water in that $CO_2$ does not readily dissolve at high temperatures, but since the partial pressure of $CO_2$ in the air is low and the amount of dissolution is small to start with, the effect of $CO_2$ on the above-mentioned bubble generation mechanism can be ignored.

As discussed above, the atmospheric components dissolved in the lubricating fluid 46 become bubbles as a result of the generation of a cavity as the hydrodynamic bearing device 4 rotates, a reduced pressure environment, and a drop in temperature. For these bubbles to be discharged to outside the hydrodynamic bearing device 4, it is necessary for them to be discharged smoothly in the tapered seal portion 48b. This is hampered, however, if the annular groove 49a is too deep.

Regarding the above-mentioned causes a) to c), for a), I) bumping must be suppressed, and for b) and c), II) bubbles that have been produced must be discharged. These will be examined below.

I) Suppressing the Explosion of Bubbles by Bumping

If the metal that makes up (the inner peripheral face 142c of) the tapered seal portion 48b is stainless steel or another such metal with lower thermal conductivity than that of copper or aluminum, the temperature of the metal surface will tend to be uneven. Therefore, if the ambient temperature should rise suddenly, bumping will occur, a large quantity of bubbles will be generated, and the lubricating fluid 46 will be scattered.

Figure 6:
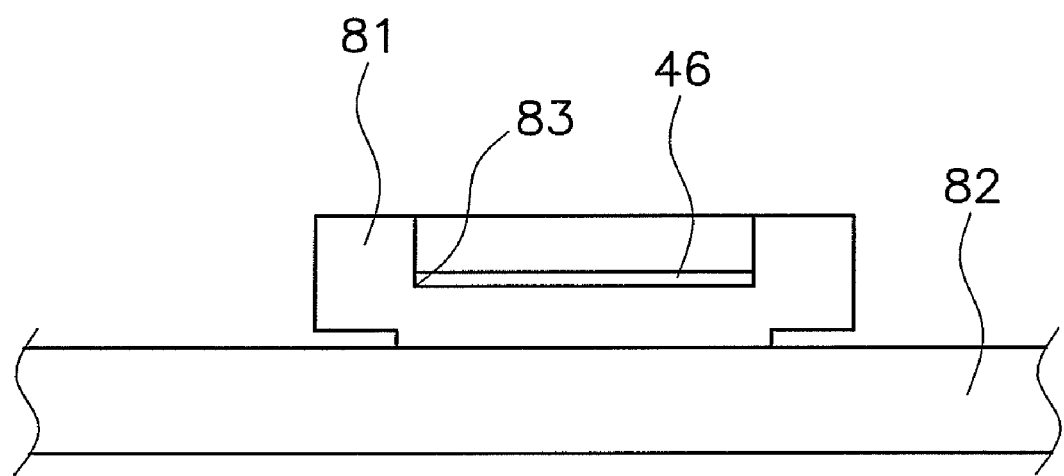
FIG. 6 is a diagram of an experiment conducted to examine bumping.

The first thing to here was to conduct an experiment to corroborate the bumping. As shown in FIG. 6, 1 μL of the lubricating fluid 46 was injected into a small, stainless steel vessel 81, the vessel 81 was placed on a glass disk 82 with a thickness of a little less than 1 mm and a diameter of approximately 90 mm, all of this was placed in an oven heated to 120° C., and the state of the lubricating fluid 46 was checked after 24 hours. The bottom corners 83 of the vessel 81 were sharp corners with a corner radius R of 20 μm or less, and the maximum height roughness Rz of the inner face of the vessel 81 was approximately 20.

Figure 7:
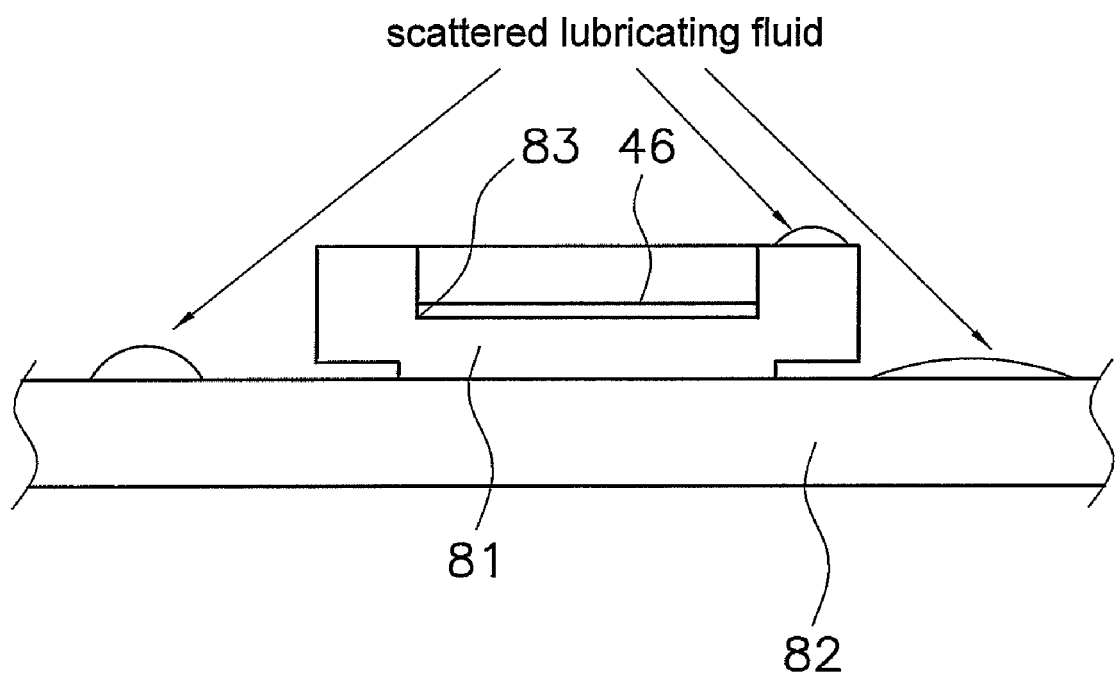
FIG. 7 is a diagram of an experiment conducted to examine bumping.

As a result, as shown in FIG. 7, most of the lubricating fluid 46 was scattered onto the upper end face of the vessel 81 and onto the glass disk 82. This experiment was repeated three times, and the same thing happened each time.

The experimental example mentioned above and another comparative example will now be discussed.

The cause of the scattering of the lubricating fluid 46 was found to be related to the maximum height roughness Rz inside the vessel 81, the corner radius R of the bottom corners 83 of the vessel 81, and the material of the vessel 81, and additional experiments were conducted three times each using various parameters. These results are given in Table 1.

TABLE 1

| | Vessel 81 | | Number of |
|---|---|---|---|
| Material | Max. height roughness Rz | Radius R of bottom corners 83 | times scattered out of three |
| stainless steel | 20 | less than 20 μm | 3 |
| | | 20 | 3 |
| | | 35 | 1 |
| | | 50 | 0 |
| | | 75 | 0 |
| | 10 | less than 20 μm | 3 |
| | 6 | | 1 |
| | 3 | | 0 |
| | 1.5 | | 0 |
| copper | 20 | less than 20 μm | 0 |
| aluminum | 10 | less than 20 μm | 0 |

It can be seen from Table 1 that the conditions under which there is no scattering (bumping) of the lubricating fluid 46 are, in regard to the vessel 81, 1) the maximum height roughness Rz is 3 or less, 2) the radius R of the bottom corners is at least 50 μm, 3) the material of the vessel is copper, or 4) the material of the vessel is aluminum; any one of these may be satisfied. The metal that makes up the hydrodynamic bearing device is usually selected from among copper-based metals, aluminum-based metals, and stainless steel, so from such standpoints as machinability, it is best to select condition 2), that the bottom corners 83 have a radius of at least 50 μm. Naturally, lowering the maximum height roughness Rz (3 or less) is very effective, but if we take into account a case of making a bearing member from a sintered metal, we see that the shape of the bottom face is easier to control than the maximum height roughness Rz.

We tend to think that an environment in which this bumping would occur is extremely rare with the PC environment in which conventional hydrodynamic bearing devices are installed, but when we consider, for example, that hard disk drives will be widely used in the future in mobile devices such as mobile telephones and video cameras, it becomes apparent that this cannot be ignored. In particular, when the device is left on an automobile body or dashboard, which can become quite hot under the summer sun, we can easily imagine a high-temperature environment, so it is important to maintain reliable performance even under harsher conditions.

II) Bubbles must be Discharged from the Annular Groove 49a

We will now discuss the conditions under which bubbles that have been generated in the hydrodynamic bearing device 4 under a reduced pressure or by a reduction in temperature do not accumulate or grow inside the annular groove 49a, and are instead smoothly discharged.

The following conditions are required for bubbles to be discharged.

i) When the bubbles expand, the force that attempts to free them from the tapered seal portion is stronger than the force that attempts to cause them to be stuck in the annular groove.

ii) Generated bubbles are able to pass through the tapered seal portion without undergoing much deformation.

Figure 8:
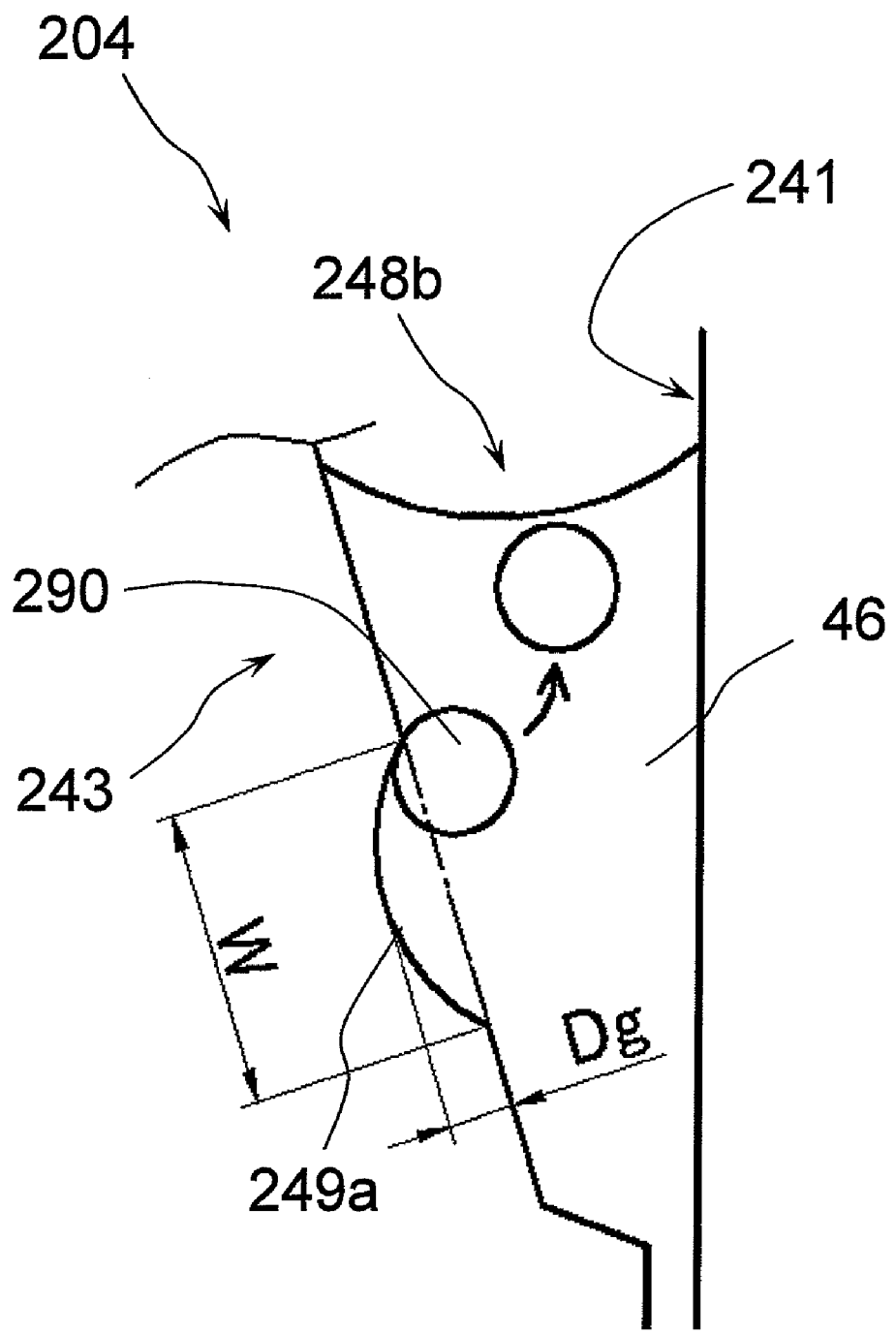
FIG. 8 is a cross section illustrating a state in which a bubble has found its way into the annular groove shown in FIG. 4.

To find the above conditions, the inventors searched for a critical point using an experimental approach.

i) As shown in FIG. 8, a simulated bearing device 204 for conducting this experiment comprised a sleeve 243 made out of transparent acrylic material, the opening of which was equipped with a tapered seal portion 248b provided with an annular groove 249a whose width W and depth Dg were variously changed. As shown in FIG. 8, a shaft 241 was inserted and then a lubricating fluid 46 was injected until it goes beyond the annular groove 249a. The shaft 241 was vibrated to agitate the lubricating fluid 46, which caused a bubble 290 to work its way into the annular groove 249a. That the bubble 290 was present was then checked visually, and the simulated bearing device 204 was placed in a vacuum chamber (not shown). In this condition, the air pressure inside the vacuum chamber was then gradually lowered, and the bubble 290 in the annular groove 249a began to expand. As shown in FIG. 8, if it can be confirmed that the bubble 290 separates from the annular groove 249a, it may be assumed that the bubble 290 is not stuck in the annular groove 249a. That is, it may be concluded that the force that attempts to free the bubble from the tapered seal portion 248b is stronger than the force that attempts to cause it to be stuck in the annular groove 249a.

Table 2 shows the results of repeating each experiment five times for combinations of these parameters (the groove width W and the groove depth Dg). In the table, the units for the groove width W and the groove depth Dg are millimeters. The pressure within the vacuum chamber was lowered to about −0.8 atm (gauge pressure). This corresponds to a situation in which the device is assumed to be shipped or used on an ordinary airliner flying at 40,000 feet. In the table, the number in the upper row in each cell is the Dg/W ratio, while the number in parentheses in the lower row is the number of times (out of five) the bubble 290 was stuck in the annular groove 249a.

TABLE 2

| Dg | W | | | | | |
|---|---|---|---|---|---|---|
| | 0.05 | 0.10 | 0.15 | 0.20 | 0.25 | 0.30 |
| 0.02 | 0.4 (1) | 0.2 (0) | 0.133 (0) | 0.1 (0) | 0.08 (0) | 0.067 (0) |
| 0.03 | 0.6 (3) | 0.3 (0) | 0.2 (0) | 0.15 (0) | 0.12 (0) | 0.1 (0) |
| 0.04 | — | 0.4 (1) | 0.267 (0) | 0.2 (0) | 0.16 (0) | 0.133 (0) |
| 0.05 | — | 0.5 (2) | 0.333 (0) | 0.25 (0) | 0.2 (0) | 0.167 (0) |
| 0.075 | — | 0.75 (5) | 0.5 (2) | 0.375 (1) | 0.3 (0) | 0.25 (0) |
| 0.10 | — | — | 0.667 (3) | 0.5 (3) | 0.4 (1) | 0.333 (0) |
| 0.125 | — | — | — | 0.625 (4) | 0.5 (3) | 0.417 (1) |

Figure 9:
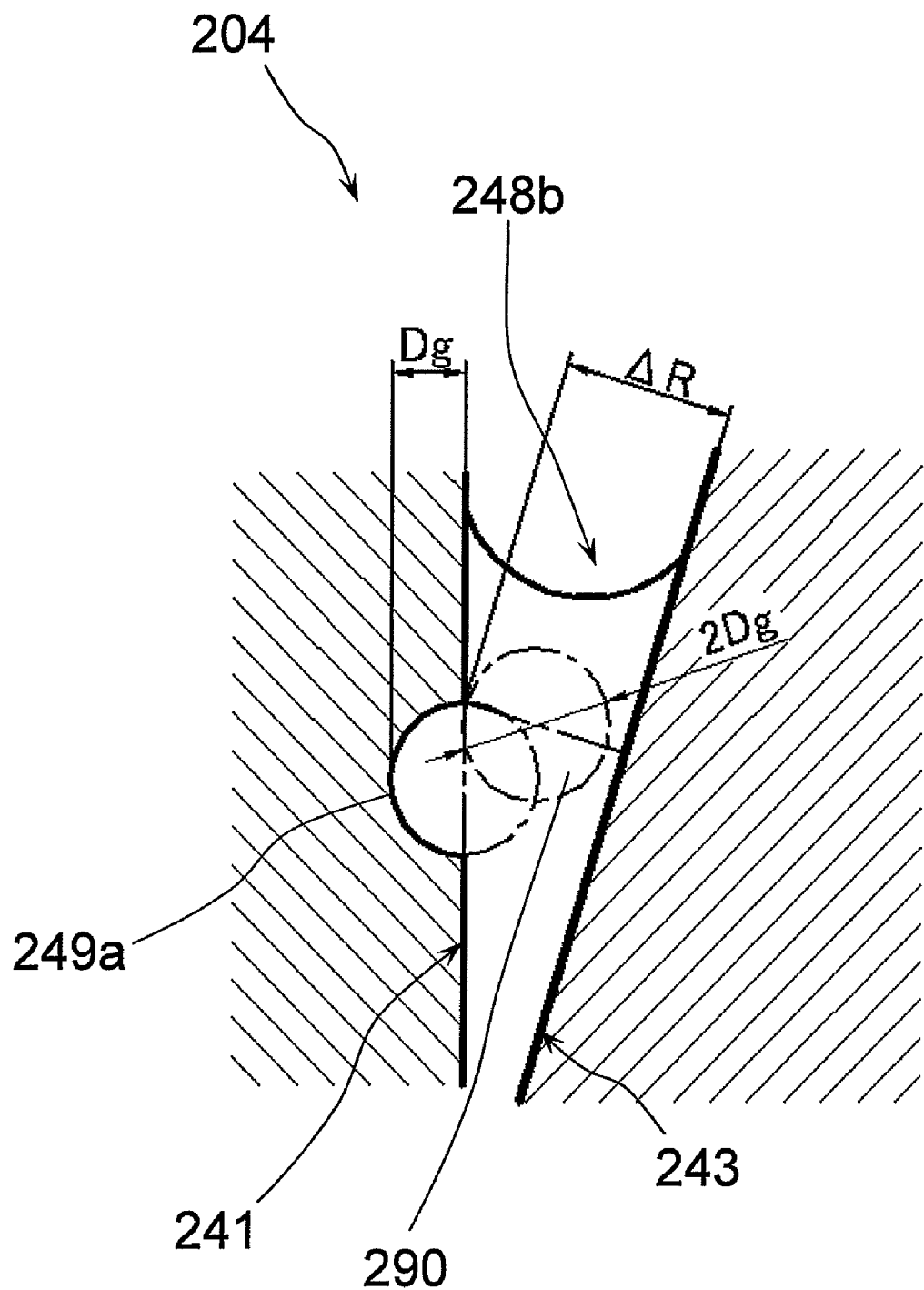
FIG. 9 is a cross section illustrating a state in which a bubble has found its way into an annular groove.

As a result, it was found that if Dg/W is 0.4 or higher, the number of times a bubble 290 becomes stuck in the annular groove 249a will be 2 or more times, and the number will be substantially zero if this ratio is less than 0.4. Preferably, the ratio is 0.3 or less because the number of times a bubble 290 becomes stuck in the annular groove 249a will be completely zero.

ii) The condition that generated bubbles are able to pass through the tapered seal portion 248b without undergoing much deformation, as shown in FIG. 9, means that the diameter of the generated bubbles 290 is smaller than the radial gap ΔR of the tapered seal portion 248b.

If the groove depth Dg is too large, the bubbles 290 in the annular groove 249a will end up being too large. With a spindle motor having a hydrodynamic bearing and used in a HDD, the gap between the shaft 241 and the sleeve 243 of the tapered seal portion 248b is most often about 200 to 300 µm. For the bubbles 290 to escape from the tapered seal portion 248b, the diameter of the bubbles 290 must be smaller than the gap ΔR of the tapered seal portion 248b. However, if the central angle of the arc shape is 180 degrees or more, the bubbles will not be able to escape from the arc portion. Here, if the groove depth Dg is 100 µm, for example, then bubbles with a radius of 100 µm (that is, a diameter of 200 µm) will form. Therefore, the gap ΔR of the bearing seal portion 248b must be at least 200 µm. Put another way, the discharge of bubbles 290 will not be hindered if the groove depth Dg is set to be ½ or less gap ΔR of the tapered seal portion 248b.

The annular groove 49a was specified above by examining the conditions that (1) the annular groove 49a can be clearly seen under a microscope when the annular groove 49a of the tapered seal portion 48b is observed from the axial direction upper side, and (2) bubbles do not accumulate in the annular groove 49a. If the annular groove 49a meets these specifications, bubbles will not become stuck in the annular groove 49a, and the lubricating fluid can be prevented from leaking out of the tapered seal portion 48b. Furthermore, the annular groove 49a can be clearly identified just by using a simple, low-power microscope, so it can easily be determined where the level of the lubricating fluid is located with respect to the annular groove 49a.

In the above embodiment, the annular groove 49a was provided on the inner peripheral face side of the outer sleeve 44, but the present invention is not limited to this, and the annular groove may be provided on the outer peripheral side of the shaft or the thrust flange. For the following reason, however, it is preferably provided on the inner peripheral face side of the sleeve.

With a fixed-shaft configuration, since the sleeve located on the outer peripheral side is what rotates, the outer peripheral side of the fluid level rises and the inner peripheral side falls due to centrifugal force during rotation. Accordingly, repeated starting and stopping of the device makes it more likely that bubbles will work their way into the annular groove on the outer peripheral face side of the shaft or the thrust flange. Meanwhile, if there is an annular groove on the inner peripheral face side of the sleeve, even if the fluid level rises or falls over or under the annular groove temporarily every time the device is started or stopped, centrifugal force will act on the outer peripheral side, so the pressure within the fluid level will rise, and the bubbles will be shifted to the inner peripheral side where the pressure is lower. Therefore, accumulation of bubbles in the annular groove is suppressed.

With a rotating-shaft configuration, the shaft side is what rotates, but just as with a fixed shaft, the fluid level is higher on the outer peripheral side and drops on the inner peripheral side. This means that the pressure is lower on the inner peripheral side. Accordingly, if there is an annular groove around the outside of the shaft, bubbles will be more apt to accumulate inside the annular groove. Therefore, again with a rotating shaft, the annular groove is preferably provided to the inner periphery of the sleeve, rather than to the outer periphery of the shaft or the thrust flange.

Figure 10:
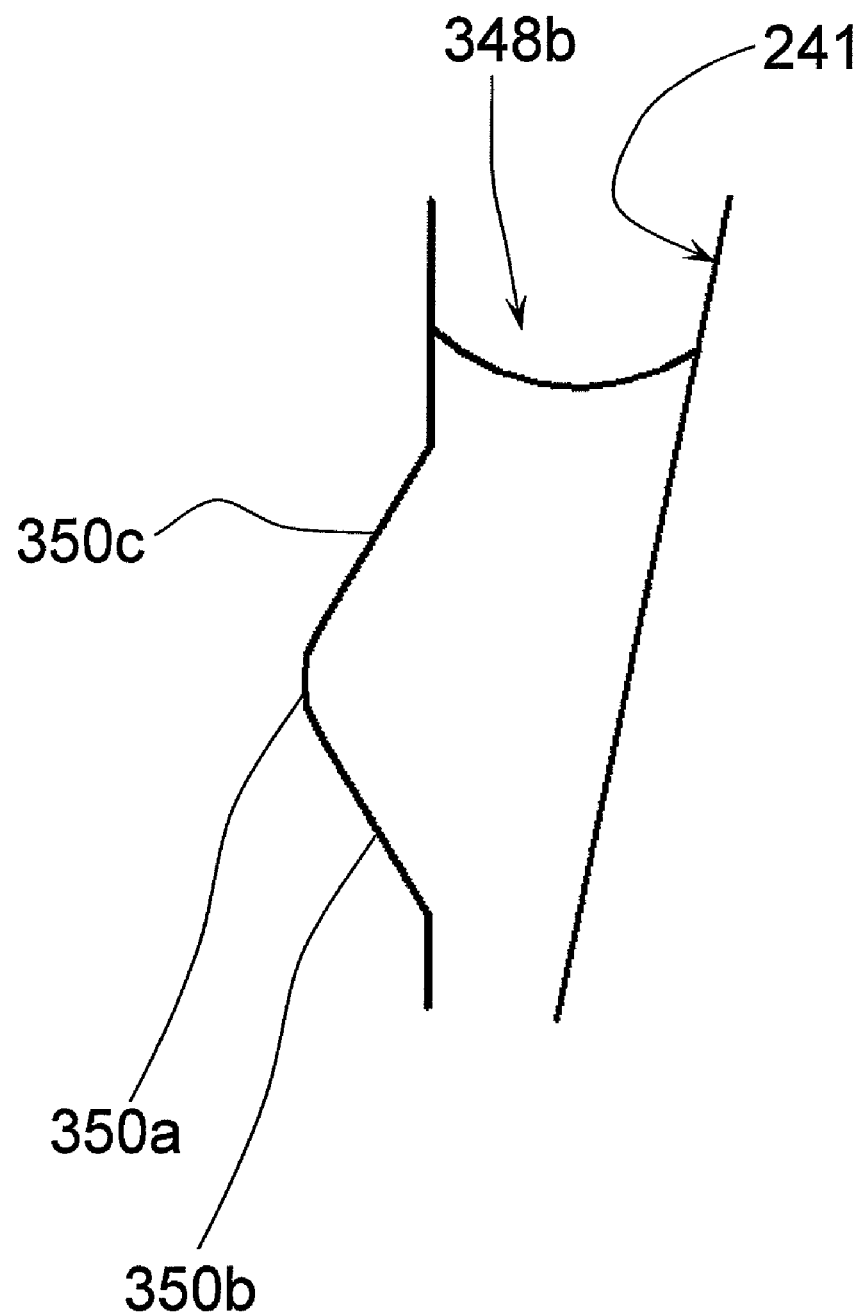
FIG. 10 is a cross section of the annular groove in another embodiment of the present invention.
Figure 11A:
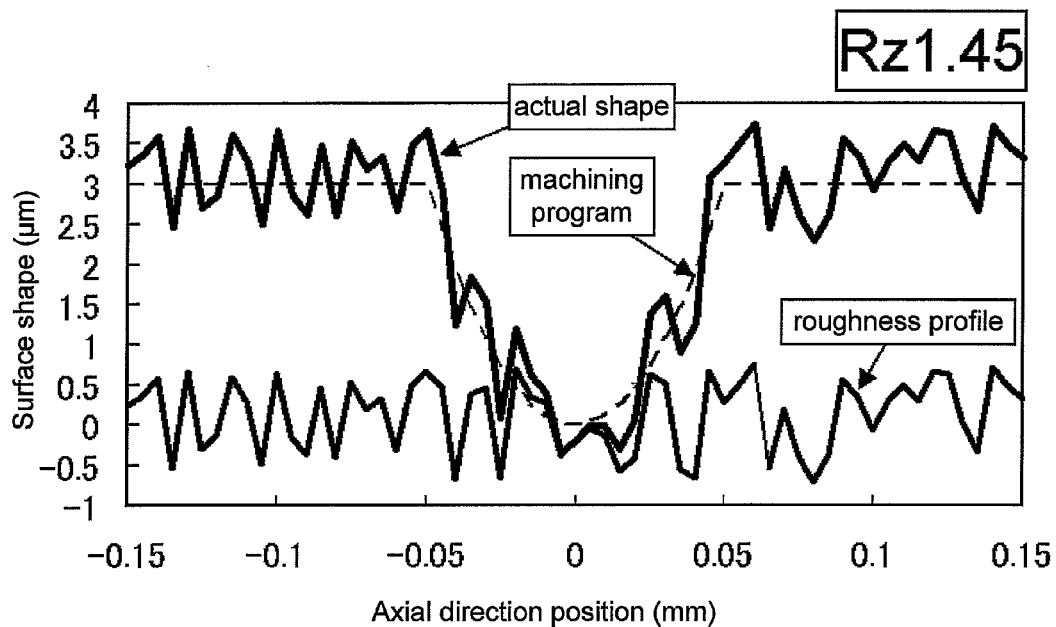
FIGS. 11A and 11B are detail view of the state near the tapered seal portion included in the hydrodynamic bearing device shown in FIG. 2.
Figure 11B:
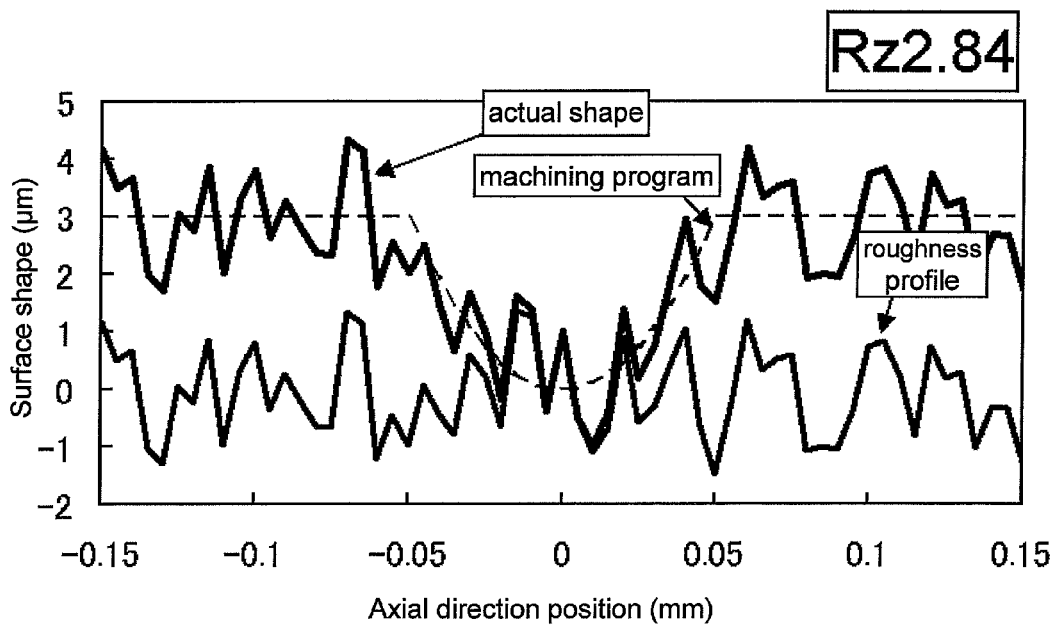

Also, the annular groove does not have to have an arc shape, and as shown in FIG. 10, an annular groove 350 in a tapered seal portion (bearing seal portion) 348b may be substantially polygonal, such that the groove bottom 350a is substantially arc shaped while the upper and lower parts 350b and 350c are linear. Here, the radius of curvature of the groove bottom 350a is preferably at least 50 μm.

Other Embodiments

An embodiment of the present invention was described above, but the present invention is not limited to the above-mentioned embodiment, and various modifications are possible without departing from the gist of the invention.

(A)

In the above embodiment, the hydrodynamic bearing device 4 was used in a vertical state, and the tapered seal portion 48b was open toward the axial direction upper side, but the present invention is not limited to this.

For instance, the present invention can be applied when the hydrodynamic bearing device 4 is used with its axis horizontal, inclined, etc.

Therefore, the lubricating fluid 46 can be prevented from leaking out from the tapered seal portion 48b, without bubbles accumulating in the annular groove 49a. Furthermore, the annular groove 49a can be clearly identified just by using a simple, low-power microscope, so it can easily be determined where the level of the lubricating fluid is located with respect to the annular groove 49a.

(B)

An example was described in the above embodiment in which, the first and second thrust flanges 41b and 41c were substantially tabular, but the present invention is not limited to this.

Figure 12A:
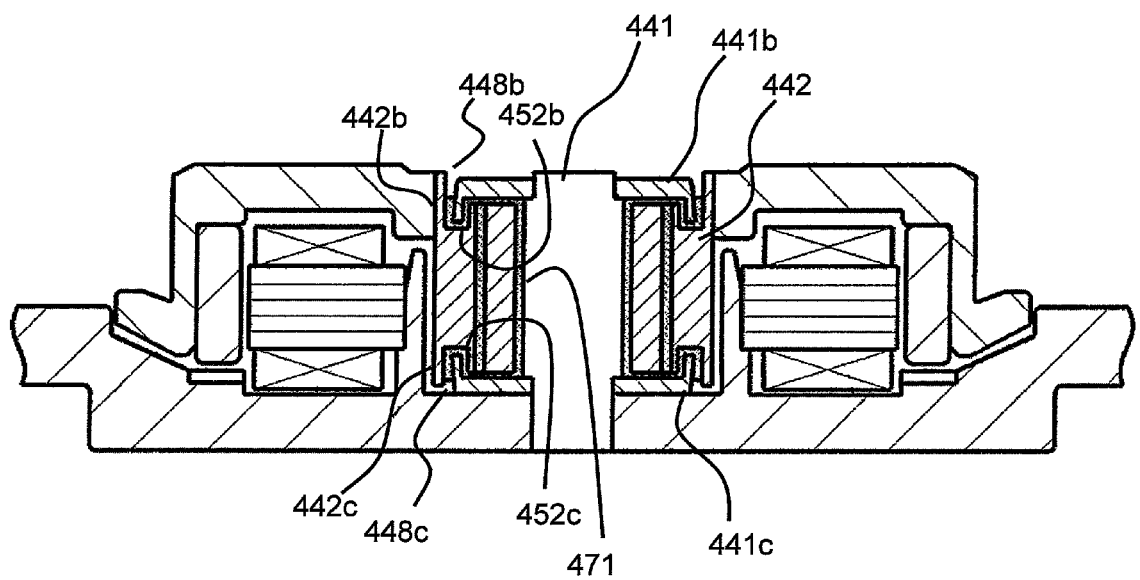
FIGS. 12A and 12B are cross section illustrating the configuration of the hydrodynamic bearing device according to another embodiment of the present invention.
Figure 12B:
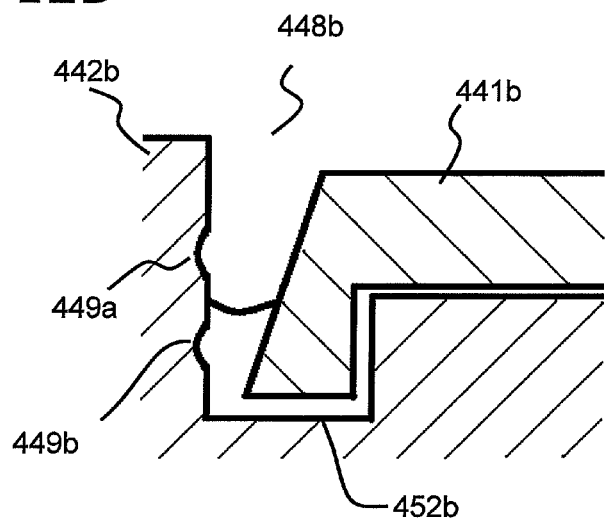

For instance, as shown in FIGS. 12A and 12B, annular concave portions 452b and 452c are disposed at both ends of a sleeve 442, and first and second cylindrical protrusions 442b and 442c are disposed on the outer peripheries of the concave portions 452b and 452c. Outer peripheral ends of first and second thrust flanges 441b and 441c having a L-shape cross-section may be disposed between the concave portions 452b and 452c and the first and second cylindrical protrusions 442b and 442c, with a microscopic gap.

Here again, the same effect as above can be obtained. Furthermore, the length of a radial bearing portion 471 can be sufficiently large, and the length of tapered seal portions 448b and 448c can be ensured sufficiently. In this case, as shown in FIG. 12B, the tapered seal portion 448b is formed between the outer peripheral face of first thrust flange 441b and the inner peripheral face of the first cylindrical protrusion 442b. Annular grooves 449a and 449b are formed on the face constituting the tapered seal portion 448b.

(C)

With the above embodiment, the description was of a double-open-ended type of hydrodynamic bearing device 4 in which both ends of the sleeve 42 are open, as shown in FIG. 1, but the present invention is not limited to this.

Figure 13:
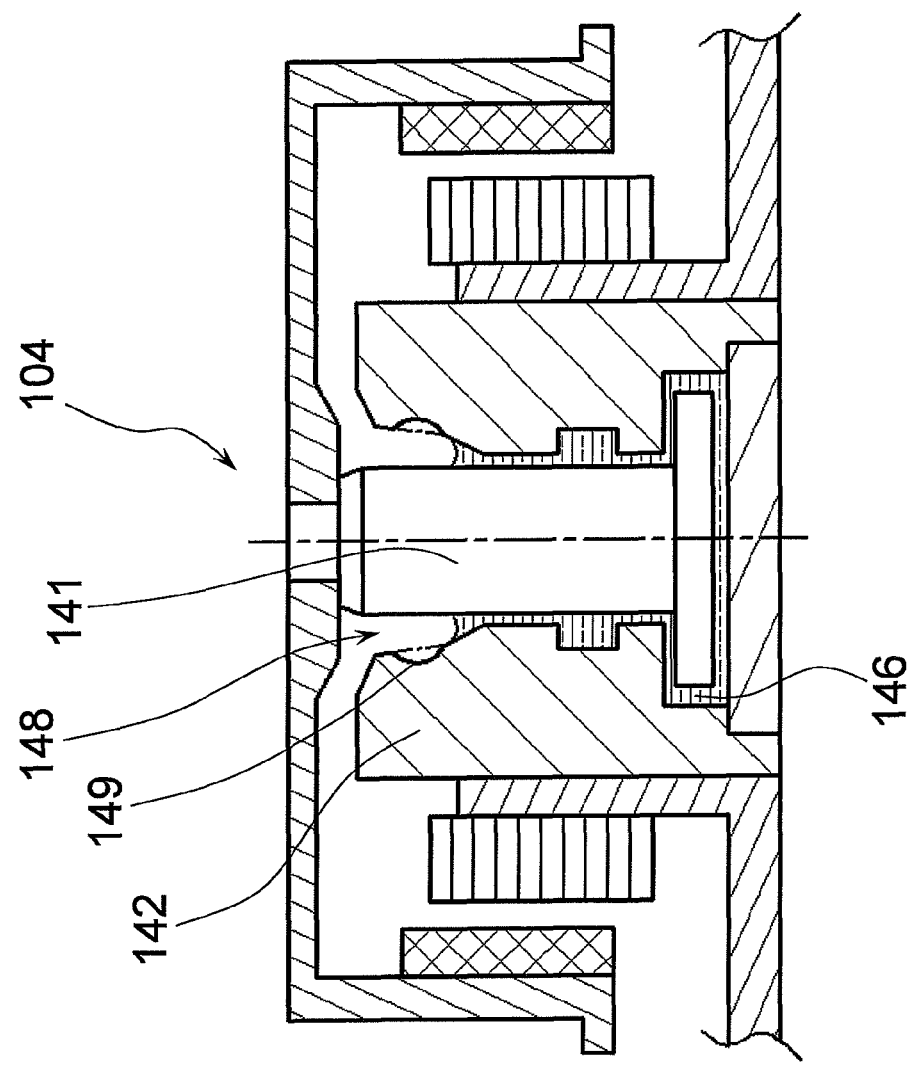
FIG. 13 is a cross section illustrating the configuration of the hydrodynamic bearing device according to another embodiment of the present invention.

For instance, as shown in FIG. 13, the present invention can also be applied to a rotating-shaft, single-open-ended type of hydrodynamic bearing device 104 in which the sleeve 142 is open on only one side.

With the hydrodynamic bearing device 104, an annular groove 149 is formed on the axial direction upper side of the sleeve 142, which is fixed, and a tapered seal portion (bearing seal portion) 148 is formed between the sleeve 142 and a shaft 141, which rotates. Here, the sleeve 142 is not configured so as to be separated into an inner sleeve and an outer sleeve, nor is there a second thrust flange. Here again, it is necessary to prevent leakage of the lubricating fluid 146 from the tapered seal portion 148, and to accurately manage the fill state of the lubricating fluid 146.

The above-mentioned effect can be obtained by applying the present invention to the constitution of the annular groove 149.

(D)

An example was described in the above embodiment in which, in the tapered seal portion 48b of the hydrodynamic bearing device 4, the annular grooves 49a and 49b were formed on the axial direction upper and lower sides, respectively, in the inner peripheral face of the outer sleeve 44, so as to be opposite the second thrust flange 41c, but the present invention is not limited to this.

For instance, according to the configuration of the hydrodynamic bearing device 4, etc., the plurality of annular grooves may be just one on the upper or lower side. Here again, applying the annular groove specifications of the present invention will prevent leakage of the lubricating fluid 46, etc., and allow the fill state of the lubricating fluid to be managed accurately.

(E)

An example was given in the above embodiment in which a cross section of the annular groove 49a had shape consisting of a single, approximate arc shape, and the annular groove 49a was specified by calculating various parameters on this assumption, but the present invention is not limited to this.

For example, the annular groove 49a may have a shape such that approximated by a plurality of substantially approximate arcs or straight lines are connected to form a single groove.

Here again, the same effect as above can be obtained. However, the conditions of the above-mentioned embodiment will have to be determined for every connection point when the mutually touching arcs or straight lines do not share tangents at the respective connection points.

The device of the present invention has improved reliability of the sealing function and improved reliability of management of filling with the lubricating fluid, and therefore can be applied to a wide range of applications, such as motors in which fluids are used.

What is claimed is:

1. A hydrodynamic bearing device, comprising:
   a fixed portion;
   a rotary portion that rotates with respect to the fixed portion;
   a lubricant that fills a microscopic gap between the rotary portion and the fixed portion;
   a hydrodynamic bearing portion that supports the rotary portion rotatably with respect to the fixed portion via the lubricant;

a bearing seal portion formed between the rotary portion and the fixed portion, near the open end of the hydrodynamic bearing portion; and at least one annular groove, provided to the rotary portion and/or the fixed portion at the bearing seal portion, with a cross section in the shape approximated by an arc or a substantially polygonal shape, and in which the relationship between the groove width W in a direction along the surface constituting the bearing seal portion and the groove depth Dg in a direction perpendicular to the surface constituting the bearing seal portion is determined on the basis of the following relational formula:

$Dg/W<0.4$.

2. The hydrodynamic bearing device according to claim 1, wherein the relationship between the groove width W and the groove depth Dg is determined on the basis of the following relational formula:

$Dg/W<0.3$.

3. The hydrodynamic bearing device according to claim 1, wherein the relationship between the groove width W and the groove depth Dg is determined on the basis of the following relational formula:

$0.025<Dg/W$.

4. The hydrodynamic bearing device according to claim 3, wherein the relationship between the groove width W and the groove depth Dg is determined on the basis of the following relational formula:

$0.05<Dg/W$.

5. The hydrodynamic bearing device according to claim 1, wherein the annular groove is such that the relationship between the groove depth Dg and the maximum height roughness Rz is determined on the basis of the following relational formula:

$Dg \geq 2Rz$.

6. The hydrodynamic bearing device according to claim 5, wherein the groove depth Dg is at least 3 μm, and is ½ or less size of the gap between the fixed portion and the rotary portion at the location of the annular groove on the bearing seal portion.

7. The hydrodynamic bearing device according to claim 1, wherein the intersection angle is at least 5 degrees at the point of contact between the face where the annular groove is disposed on the bearing seal portion and the face of the annular groove that is in the shape approximated by the arc or the substantially polygonal shape.

8. The hydrodynamic bearing device according to claim 7, wherein the intersection angle is at least 10 degrees at the point of contact between the face having the annular groove and the face of the annular groove that is in the shape approximated by the arc or the substantially polygonal shape.

9. The hydrodynamic bearing device according to claim 1, wherein the radius of curvature of the face of the annular groove that is in the shape approximated by the arc or the substantially polygonal shape is at least 50 μm.

10. A spindle motor, comprising the hydrodynamic bearing device according to claim 1.

11. A recording and reproducing apparatus, comprising:
a recording medium;
a head for recording and reproducing information to and from the recording medium; and
the spindle motor according to claim 10, for rotationally driving the recording medium or the head.

12. A hydrodynamic bearing device, comprising:
a fixed portion;
a rotary portion that rotates with respect to the fixed portion;
a lubricant that fills a microscopic gap between the rotary portion and the fixed portion;
a hydrodynamic bearing portion that supports the rotary portion rotatably with respect to the fixed portion via the lubricant;
a bearing seal portion formed between the rotary portion and the fixed portion, near the open end of the hydrodynamic bearing portion; and
at least one annular groove, provided to the rotary portion and/or the fixed portion at the bearing seal portion, with a cross section in the shape approximated by an arc or a substantially polygonal shape, and in which the intersection angle is at least 5 degrees at the point of contact between the surface constituting the bearing seal portion and the face that is in the shape approximated by the arc or the substantially polygonal shape.

13. The hydrodynamic bearing device according to claim 12, wherein the intersection angle is at least 10 degrees at the point of contact between the face having the annular groove and the face that is in the shape approximated by the arc or the substantially polygonal shape.

14. The hydrodynamic bearing device according to claim 12, wherein the annular groove is formed according to the range of tolerance for the position of the lubricant level.

15. A spindle motor, comprising the hydrodynamic bearing device according to claim 12.

16. A recording and reproducing apparatus, comprising:
a recording medium;
a head for recording and reproducing information to and from the recording medium; and
the spindle motor according to claim 15, for rotationally driving the recording medium or the head.

* * * * *